United States Patent
Bandini et al.

(10) Patent No.: US 10,116,621 B2
(45) Date of Patent: Oct. 30, 2018

(54) METHOD AND SYSTEM FOR MESSAGING SECURITY

(71) Applicant: Axway Inc., Phoenix, AZ (US)

(72) Inventors: Jean-Christophe Denis Bandini, Brussels (BE); Jeffrey C. Smith, Atherton, CA (US)

(73) Assignee: Axway Inc., Phoenix, AZ (US)

( * ) Notice: Subject to any disclaimer, the term of this patent is extended or adjusted under 35 U.S.C. 154(b) by 0 days.

(21) Appl. No.: 13/849,432

(22) Filed: Mar. 22, 2013

(65) Prior Publication Data
US 2014/0041013 A1 Feb. 6, 2014

Related U.S. Application Data

(63) Continuation of application No. 12/172,819, filed on Jul. 14, 2008, now Pat. No. 8,407,780, which is a
(Continued)

(51) Int. Cl.
*H04L 29/06* (2006.01)
*G06Q 10/00* (2012.01)
(Continued)

(52) U.S. Cl.
CPC ............ *H04L 63/02* (2013.01); *G06Q 10/00* (2013.01); *H04L 9/32* (2013.01); *H04L 51/12* (2013.01);
(Continued)

(58) Field of Classification Search
CPC ..... H04L 9/0802; H04L 9/0825; H04L 9/083; H04L 9/006; H04L 9/3263; H04L 29/06775; H04L 2209/64; G11B 20/00224
(Continued)

(56) References Cited

U.S. PATENT DOCUMENTS 5,278,984 A 1/1994 Batchelor
5,283,856 A 2/1994 Gross et al.
(Continued)

FOREIGN PATENT DOCUMENTS

EP 0 420 779 3/1991
EP 0 680 187 11/1995
(Continued)

OTHER PUBLICATIONS

S. Kent, Privacy Enhancements for Internet Electronic Mail, Part 11: Certificate Based Key Management, Network Working Group, Request for Comments 1422, Feb. 1993, pp. 1-31.*
(Continued)

*Primary Examiner* — Hadi S Armouche
*Assistant Examiner* — Paul E Callahan
(74) *Attorney, Agent, or Firm* — Haynes and Boone, LLP

(57) ABSTRACT

An e-mail firewall applies policies to e-mail messages transmitted between a first site and a plurality of second sites. The e-mail firewall includes a plurality of mail transfer relay modules for transferring e-mail messages between the first site and one of the second sites. Policy managers are used to enforce and administer selectable policies. The policies are used to determine security procedures for the transmission and reception of e-mail messages. The e-mail firewall employs signature verification processes to verify signatures in received encrypted e-mail messages. The e-mail firewall is further adapted to employ external servers for verifying signatures. External servers are also used to retrieve data that is employed to encrypt and decrypt e-mail messages received and transmitted by the e-mail firewall, respectively.

16 Claims, 14 Drawing Sheets

Related U.S. Application Data continuation of application No. 11/522,012, filed on Sep. 14, 2006, now Pat. No. 7,401,356, which is a continuation of application No. 09/887,313, filed on Jun. 22, 2001, now Pat. No. 7,127,741.

(51) Int. Cl.
*H04L 12/58* (2006.01)
*H04L 9/32* (2006.01)

(52) U.S. Cl.
CPC ...... *H04L 63/0227* (2013.01); *H04L 63/0428* (2013.01); *H04L 63/0442* (2013.01); *H04L 63/08* (2013.01); *H04L 63/0823* (2013.01); *H04L 63/12* (2013.01)

(58) Field of Classification Search
USPC ..... 380/259; 705/50, 55; 713/150, 151, 153, 713/154, 175; 726/11, 14
See application file for complete search history.

(56) References Cited

U.S. PATENT DOCUMENTS

| | | | |
|---|---|---|---|
| 5,331,543 | A | 7/1994 | Yajima et al. |
| 5,369,707 | A | 11/1994 | Follendore, III |
| 5,406,557 | A | 4/1995 | Baudoin |
| 5,414,833 | A | 5/1995 | Hershey et al. |
| 5,416,842 | A | 5/1995 | Aziz |
| 5,530,758 | A | 6/1996 | Marino et al. |
| 5,555,346 | A | 9/1996 | Gross et al. |
| 5,577,202 | A | 11/1996 | Padgett |
| 5,606,668 | A | 2/1997 | Shwed |
| 5,623,600 | A | 4/1997 | Ji et al. |
| 5,627,764 | A | 5/1997 | Schutzman et al. |
| 5,632,011 | A | 5/1997 | Landfield et al. |
| 5,740,231 | A | 4/1998 | Cohn et al. |
| 5,748,738 | A | 5/1998 | Bisbee et al. |
| 5,748,884 | A | 5/1998 | Royce et al. |
| 5,778,174 | A | 7/1998 | Cain |
| 5,796,948 | A | 8/1998 | Cohen |
| 5,802,253 | A | 9/1998 | Gross et al. |
| 5,826,023 | A | 10/1998 | Hall et al. |
| 5,828,893 | A | 10/1998 | Wied et al. |
| 5,832,208 | A | 11/1998 | Chen et al. |
| 5,835,594 | A | 11/1998 | Albrecht et al. |
| 5,835,726 | A | 11/1998 | Shwed |
| 5,848,415 | A | 12/1998 | Guck |
| 5,864,683 | A | 1/1999 | Boebert et al. |
| 5,889,943 | A | 3/1999 | Ji et al. |
| 5,909,493 | A | 6/1999 | Motoyama |
| 5,915,024 | A | 6/1999 | Kitaori et al. |
| 5,978,484 | A | 11/1999 | Apperson et al. |
| 5,983,350 | A | 11/1999 | Minear et al. |
| 6,072,942 | A | 6/2000 | Stockwell et al. |
| 6,073,142 | A | 6/2000 | Geiger et al. |
| 6,092,101 | A | 7/2000 | Birrell et al. |
| 6,154,840 | A | 11/2000 | Pebley et al. |
| 6,161,181 | A | 12/2000 | Haynes, III et al. |
| 6,182,118 | B1 | 1/2001 | Finney et al. |
| 6,237,096 | B1 | 5/2001 | Bisbee et al. |
| 6,285,991 | B1 | 9/2001 | Powar |
| 6,324,648 | B1 | 11/2001 | Grantges, Jr. |
| 6,336,186 | B1 | 1/2002 | Dyksterhouse et al. |
| 6,356,937 | B1 * | 3/2002 | Montville ............ H04L 9/3263 709/206 |
| 6,385,655 | B1 | 5/2002 | Smith et al. |
| 6,393,568 | B1 | 5/2002 | Ranger et al. |
| 6,424,718 | B1 | 7/2002 | Holloway |
| 6,442,686 | B1 * | 8/2002 | McArdle ............ H04L 12/585 713/151 |
| 6,584,563 | B1 | 6/2003 | Kikuchi et al. |
| 6,609,196 | B1 | 8/2003 | Dickinson et al. |
| 6,651,166 | B1 | 11/2003 | Smith et al. |
| 6,853,988 | B1 | 2/2005 | Dickinson et al. |
| 6,978,025 | B1 * | 12/2005 | Price, III ............... 380/282 |
| 7,096,497 | B2 | 8/2006 | Ellison et al. |
| 7,117,358 | B2 | 10/2006 | Bandini et al. |
| 7,127,741 | B2 | 10/2006 | Bandini et al. |
| 7,380,274 | B2 | 5/2008 | Dickinson, III et al. |
| 7,401,356 | B2 | 7/2008 | Bandini et al. |
| 2001/0039615 | A1 | 11/2001 | Bowker et al. |
| 2003/0051142 | A1 | 3/2003 | Hidalgo et al. |
| 2004/0193922 | A1 | 9/2004 | Bandini |
| 2007/0005983 | A1 | 1/2007 | Dickinson, III et al. |

FOREIGN PATENT DOCUMENTS

| | | | |
|---|---|---|---|
| GB | 2318486 | | 4/1998 |
| JP | 3-117940 | A | 5/1991 |
| JP | 5-207029 | A | 8/1993 |
| JP | 6-276221 | A | 9/1994 |
| JP | 7-107082 | A | 4/1995 |
| JP | 8-204701 | A | 8/1996 |
| JP | 8-251156 | A | 9/1996 |
| JP | 8-263404 | A | 10/1996 |
| JP | 9-252294 | A | 9/1997 |
| JP | 10-504168 | | 4/1998 |
| JP | 2000-515332 | | 11/2000 |
| JP | 2001-505371 | | 4/2001 |
| WO | WO 96/35994 | | 11/1996 |
| WO | WO 97/00471 | | 1/1997 |
| WO | WO 97/24825 | | 7/1997 |
| WO | WO 99/05814 | | 2/1999 |
| WO | WO9905814 | * | 2/1999 ............... H04K 1/00 |

OTHER PUBLICATIONS

Cate, Vincent, "Email-Firewalls"/Instant Corporate PGP, May 21, 1994, pp. 1-2.

Levien, Ralph, "Protecting Internet E-Mail from Prying Eyes," Data Communications, May 1996, pp. 117-126.

Matunaga, Yasuhiko and Sebayashi, Katsuhiro, "Adaptive Route Filtering for the Stable Internet Routing," NTT Multimedia Networks Laboratories, Tokyo, Technical Report of IEICE SSE 97-5, Apr. 1997.

Net PC, vol. 2, No. 2, Feb. 1997, pp. 158-163.

Nikkei Open Systems, No. 52, Jul. 1997, p. 316-346.

Pollock, Stephen, "A Rule-Based Message Filtering System," ACM Transactions on Office Information Systems, vol. 6, No. 3, Jul. 1, 1998, pp. 232-254.

Schneider, Bruce, "Applied Cryptography," 2nd Ed., Oct. 1995, John Wiley & Sons, pp. 31-33 and 185-187.

"Windows NT vs X," Interface, May 1994, pp. 203-212.

Press Release, Integralis Announces MIMEsweeper Compatible with Check Point FireWall-1 on Single NT Server, Sep. 16, 1996 (document apparently printed Sep. 30, 2003), 2 pages.

Cheswick, W.R. and Bellovin, S.M., "Firewalls and Internet Security-Repelling the Wily Hacker," Addison Wesley 1st ed., 1994, 298 pages.

Department of the Army, US Army Corps of Engineers, Emergency Employment of Army and Other Resources, "Emergency Operations Center Standard Operating Procedures (HQUSACE-EOCSPO)," OM 500-1-6, Appendix C, Jul. 12, 1994, 56 pages.

Integralis Asia Pacific, "Total Email Content Management Countering Email Borne Threats," White Paper MIMEsweeper, Jan. 1996, pp. 1-12.

Author unknown, 3rd party search of internet archive (2 pages) and printouts (31 pages), apparently representing content archived from http://www.nha.com circa Nov. 12, 1996. Printouts include pages apparently descriptive of a MIMEsweeper (documents apparently received from 3rd Party and apparently printed Jun. 8, 2004), 33 pages.

Press Release, Integralis releases MIMEsweeper Version 2.0 with SMTP mail security support, Jan. 15, 1996 (document apparently received from 3rd Party and apparently printed Jun. 8, 2004), 2 pages.

Press Release, Integralis announces version 2.3 of MIMEsweeper with new email security features, Jun. 13, 1996 (document apparently received from 3rd Party and apparently printed Jun. 8, 2004), 2 pages.

(56) References Cited

OTHER PUBLICATIONS

S. Kent, Privacy Enhancement for Internet Electronic Mail: Part II: Certificate-Based Key Management, Network Working Group, Request for Comments 1422, Feb. 1993, pp. 1-33.
S. Kent, Privacy Enhancement for Internet Electronic Mail: Part II: Certificate-Based Key Management, Network Working Group, Request for Comments 1422, Feb. 1993, p. 4.
Smith, Richard E., "Constructing a High Assurance Mail Guard," Secure Computing, San Jose, CA, 1994, pp. 1-10.
Serinelli, Bob & Leisher, Tim, "Securing Electronic Mail Systems," Milcom 92, 677-680, 1992, 4 pages.
Smith, Randall E., "A Secure Email Gateway, Computer Security Applications," 11th Annual Conference, 1994, pp. 202-211.
Tumbleweed Communications, *Corp.* v. *Sendmail, Inc.*, Defendant Sendmail, Inc.'s Invalidity Contentions, Feb. 13, 2009, pp. 1-3, 11-12, and 21.
Trend Micro, Inc. "Antivirus.com—Press Releases", May 14, 1997, pp. 1-2.
Key Recovery Alliance "Business Requirement for Key Recovery Draft 2.1", Sep. 4, 1997, pp. 1-16.
Check Point Software Technologies, Ltd. "Internet Security gets Less Costly and Easier to Manage", Sep. 16, 1996, pp. 1-2.
Check Point Software Technologies, Ltd. "Check Point enables Secure Business Over the Internet With FireWall-1 2.0", Sep. 18, 1995, pp. 1-3.
Check Point Software Technologies, Ltd. "Check Point Fire Wall-1 3.0 Awarded Best of Show at Net World+ Interprop Paris", Oct. 14, 1996, pp. 1-2.
Check Point Software Product Information "understanding Check Point Products", pp. 1-2, publication date unknown, received from third party on Feb. 26, 2009.
Check Point Software Technologies, Ltd. "Check Point Software Delivers Breakthrough Security Advancements with Fire Wall-1 3.0", Oct. 7, 1996, pp. 1-4.
Check Point Software Technologies, Ltd. "Check Point Software Unveils Fire Wall-1 Version 2.1", Jun. 17, 1996, pp. 1-3.
Check Point Software Technologies, Ltd. "Check Point Software Technologies Ltd. Awarded Patent for Stateful Inspection Technologies", Mar. 17, 1997, 1 page.
Check Point Software Technologies, Ltd. "Integralis Announces OPSEC-complaint MMEsweeper for Fire Wall-1", Apr. 28, 1997, pp. 1-2.
Check Point-Fire Wall-1 "Fire Wall-1 version 2.1", 7 pages, publication date unknown, received from third party on Feb. 26, 2009.
Check Point Software "Check Point Fire Wall-1—Introduction", Mar. 1997, pp. 1-2.
Check Point Software "Check Point Fire Wall-1 Release 3.0", 1 page, publication date unknown, received from third party on Feb. 26, 2009.
Check Point Software "Check Point Fire Wall-1 Version 3.0 Highlights", pp. 1-3, publication date unknown, received from third party on Feb. 26, 2009.
Check Point Software Technologies, Ltd. "Check Point Fire Wall-1™ White Paper", Version 3.0, Jun. 1997, pp. 1-34.
Dunlap, C., " Worldtalk to deliver E-Mail Firewall", Computer Reseller News, Jun. 16, 1997, 1 page.
Machlis, S., Computerworld "Check Point makes firewall security's Grand Central", Apr. 21, 1997, 1 page.
MIMEsweeper "Configuring MAILsweeper for SMTP", pp. 1-4 publication date unknown, received from third party on Feb. 26, 2009.
ConnectSoft Inc. "ConnectSoft Ships S/MIME Compliant Email Connection 3.1", Oct. 4, 1996, 1 page.
Trend Micro Inc. "Trend Micro Sues Integralis for Gateway Anti-Virus Patent Infringement", Jul. 8, 1997, pp. 1-2.
RSA Encryption Inc. "Data Security, Inc. Pressbox", Nov. 1996, pp. 1-7.
Deming Software "Secure Messenger™", pp. 1-3, publication date unknown, received from third party on Feb. 26, 2009.
Rodriguez, K., Deming Software "Secure Mail Spec Gets Boost—Secure MIME will soon see broad industry support", Apr. 8, 1996, pp. 1-2.
Deming Software "Deming Internet Security", Nov. 1996, 1 page.
Deming Software "Fontana Software Announces Secure E-mail Solution for Qualcomm's Eudora Pro 3.0 at EMA '96", Apr. 30, 1996, pp. 1-2.
Deming Software Inc. "Deming Software Licenses Technology from RSA Data Security for Secure E-mail Product and Developers' Toolkit", Apr. 2, 1996, pp. 1-2.
Deming Software "Press Box—Press Release", 1996, 1 page.
Deming Software, Inc. Deming Software Announces Secure E-mail Solution for Microsoft Exchange at Networld+Interop, Apr. 2, 1996, pp. 1-2.
RSA Data Security Inc. "Develop industry-standard secure, interoperable electronic mail applications", pp. 1-3, publication date unknown, received from third party on Feb. 26, 2009.
Fontana, J., World Talk Secures E-Mail Servers, Communications Week, Jun. 30, 1997, pp. 1-2.
MIMEsweeper, "Evaluating Email Anti-Virus Solutions", pp. 1-4, publication date unknown, received from third party on Feb. 26, 2009.
Check Point "Fire Wall-1 Access Control", pp. 1-5, publication date unknown, received from third party on Feb. 26, 2009.
Check Point "FireWall-1 Content Security", pp. 1-4, publication date unknown, received from third party on Feb. 26, 2009.
Check Point "Fire Wall-1 Supported Applications", pp. 1-5. Publication date unknown, received from a third party on Feb. 26, 2009.
Check Point Home Page "Table of Contents", pp. 1-6, publication date unknown, received from third party on Feb. 26, 2009.
Check Point "What's in the News?", pp. 1-3, publication date unknown, received from third party on Feb. 26, 2009.
NHA "Lexical Analysis in MIMEsweeper", pp. 1-4, publication date unknown, received from third party on Feb. 26, 2009.
GlobalKey Inc. "GlobalKey's Suite of Products and Se4rvices", pp. 1-3, publication date unknown, received from third party on Feb. 26, 2009.
GlobalKey Inc "GlobalKey Secure E-Mail Plus", pp. 1-2, publication date unknown, received from third party on Feb. 26, 2009.
Wingfield, N., "Checkpoint Software touts FireWall-1 for VPNs", Infoworld, Sep. 25, 1995, p. 71.
Carreon, J. "Products Overview", InfoWorld, Jul. 29, 1996, p. 74.
Antivirus "InterScan E-Mail Virus Wall™", pp. 1-2, publication date unknown, received from third party on Feb. 26, 2009.
Canter, S. "internet E-mail encryption", Apr. 8, 1997, PC Magazine, 5 pages.
Business Wire "Internet Security gets Less Costly and Easier to Manage: Integralis Announces MINEsweeper Compatible with Check Point FireWall-1 on Single NT Server; E-mail virus detection and content management can reside on Firewall server, saving money and support costs", Sep. 16, 1996, pp. 1-3.
Antivirus "InterScan Virus Wall™ The Internet Anti-Virus Security Suite", pp. 1-2, publication date unknown, received from third party on Feb. 26, 2009.
Schaff, W. "Commercial Firewalls—A Burning commodity", Information Week, Dec. 9, 1996, p. 120.
Check Point Software Technologies Ltd., "Leading Content Security Vendors Announce Support for check Point Fire Wall-1 3.0", Oct. 7, 1996, pp. 1-3.
Integralis Ltd. "Administrator's Guide Version 3.1", 1997, pp. 1-3, publication date unknown, received from third party on Feb. 26, 2009.
MIMEsweeper "5 Content security—Table of Contents", pp. 1-3, publication date unknown, received from third party on Feb. 26, 2009.
MIMEsweeper "6 Management—Table of Contents", pp. 1-2, publication date unknown, received from third party on Feb. 26, 2009.
MIMEsweeper "MAILsweeper Table of Contents", pp. 1-6, publication unknown, received from third party on Feb. 26, 2009.
MIMEsweeper 2.0 Press Release "Integralis releases MIMEsweeper Version 2.0 with SMTP mail security support", Jan. 15, 1996, pp. 1-2.

(56) References Cited

OTHER PUBLICATIONS

MIMEsweeper "MIMEsweeper Table of Contents", pp. 1-3, publication date unknown, received from third party on Feb. 26, 2009.
MIMEsweeper "MIMEsweeper Downloads", 1 page, publication date unknown, received from third party on Feb. 26, 2009.
NHA "Frequently Asked Questions", pp. 1-3, publication date unknown, received from third party on Feb. 26, 2009.
MIMEsweeper "MIMEsweeper Review Business Computer World—How can you protect against viruses?", Dec. 1996, pp. 1-2.
MIMEsweeper "MIMEsweeper Review PC User—Combat e-mail viruses and spies", Oct. 1996, pp. 1-2.
MIMEsweeper "MIMEsweeper Review Secure Computing—MIMEsweeper—Secure Computing's Editor's Choice", Sep. 1996, pp. 1-2.
MIMEsweeper "MIMEsweeper Frequently Asked Technical Questions", pp. 1-2, publication date unknown, received from third party on Feb. 26, 2009.
Deming Software "Message Security Plug-in for Eudora Pro™ 3.0 Available Online from Deming Software", Oct. 15, 1996, pp. 1-2.
NH&A anti-virus, security & network management "Who we are", pp. 1-5, publication date unknown, received from third party on Feb. 26, 2009.
Messmer, E. "Check Point adds fuel to firewall", Network World, Oct. 28, 1996, p. 37.
Messmer, E. "Intranets & the 'Firewall' 'checks' out ODBC data", Network World, Nov. 25, 1996, p. 33.
OpenSoft Corporation "Now you can safely order online!", Dec. 31, 1996, pp. 1-2.
OpenSoft "OpenSoft ExpressMail 32-bit client", pp. 1-2, publication date unknown, received from third party on Feb. 26, 2009.
OpenSoft "OpenSoft ExpressMail™ Server High Performance Internet Messaging Server", pp. 1-3, publication date unknown, received from third party on Feb. 26, 2009.
OpenSoft "Open Soft Certificate Server Massively Scalable Certificate Distribution System for the Internet", pp. 1-2, publication date unknown, received from third party on Feb. 26, 2009.
OpenSoft "OpenSoft ExpressMail User Manual Running ExpressMail Server", pp. 1-4, publication date unknown, received from third party on Feb. 26, 2009.
OpenSoft "OpenSoft Express Mail User Manual Setting Up ExpressMail Server", pp. 1-2, publication date unknown, received from third party on Feb. 26, 2009.
OpenSoft "OpenSoft ExpressMail User Manual Server Administrator's Guide Table of Contents", pp. 1-2, publication date unknown, received from third party on Feb. 26, 2009.
OpenSoft "OpenSoft ExpressMail User Manual Client User's Guide Table of Contents", pp. 1-3, publication date unknown, received from third party on Feb. 26, 2009.
Avolio, F., and Ranum, M. "A Network Perimeter with Secure External Access", Trusted Information Systems, Inc., Symposium on Network and Distributed System Security, Feb. 2-4, 1994, pp. 109-119.
RSA "Ciphertext, the RSA Newsletter", vol. 3, No. 1, Fall 1995, pp. 1-8.
Dusse, S. and Matthews, T., "S/MIME: Anatomy of a Secure E-mail Standard", RSA Data Security, Inc., pp. 1-4, publication date unknown, received from third party on Feb. 26, 2009.
RSA "S/MIME Central General Information", pp. 1-3, publication date unknown, received from third party on Feb. 26, 2009.
Deming "S/MIME Keys", 1 page, publication date unknown, received from third party on Feb. 26, 2009.
ConnectSoft Inc. "S/MIME Arrives! ConnectSoft E-Mail Connection 3.0 Ships", May 14, 1996, pp. 1-2.
Trend Micro Inc. "ScanMail & the Epidemiology of E-mail Virus Outbreaks", Mar. 30, 1996, pp. 1-4.
Trend Micro Inc. "ScanMail for cc:Mail, a client-side virus protection software that detects and cleans viruses attached to e-mail messages Product Specification", pp. 1-4, publication date unknown, received from a third party on Feb. 26, 2009.

Trend Micro "ScanMail for Lotus Notes—Keeps viruses out of your Lotus Notes environment", pp. 1-3, publication date unknown, received from third party on Feb. 26, 2009.
Antivirus.com "ScanMail™ for Microsoft Exchange Server", pp. 1-2, publication date unknown, received from third party on Feb. 26, 2009.
Deming Screen Shots "Secure Messenger Screen Shots", pp. 1-2, publication unknown, received from third party on Feb. 26, 2009.
Integralis UK "Security Solutions Index", 1 page, publication date unknown, received from third party on Feb. 26, 2009.
NHA "MIMEsweeper 'Online' SPD", pp. 1-9, publication date unknown, received from third party on Feb. 26, 2009.
Gaines, B. "Supporting Collaboration through Multimedia Digital Document Archives", Version 1.0, Nov. 1994, pp. 1-53.
Trend Micro Press Release "Trend Micro Announces Virus Protection for Microsoft Exchange Server", Nov. 6, 1996, pp. 1-2.
Trend Micro, Inc. "Anti-Virus for the Enterprise, Corporate Overview—Company profile", pp. 1-2, publication date unknown, received from third party on Feb. 26, 2009.
Trend Micro, Inc. "Antivirus, About Trend—Analyst", pp. 1-3, publication date unknown, received from third party on Feb. 26, 2009.
Deming Acquisition "Worldtalk Acquires Deming Software Internet Mail Security Software Developer", Nov. 11, 1996, 1 page.
Worldtalk Press Release "Worldtalk to Aquire Deming Software", Nov. 12, 1996, pp. 1-3.
McNamara, P., "Worldtalk tool to thwart e-mail threats", Network World, Jun. 23, 1997, p. 47.
Integralis Technology Ltd. "For Fire Wall-1 Administrator's Guide Version 1.0", Revision 1.0, 1997, pp. 1-3.
Exclusive ProLiant 5000, Oct. 20-Nov. 12, 1996, 1 page.
New Products—MIMEsweeper 2.3-2, "Combat e-mail viruses and spies", Oct. 30-Nov. 12, 1996; 1page.
MIMEsweeper "Email Content Management and Control", pp. 1-4, publication date unknown, received from third party on Feb. 26, 2009.
Content Security White Paper "A Discussion of content based threats from the Internet and other internal and public networks", pp. 1-17, publication date unknown, received from third party on Feb. 26, 2009.
Trend Micro Incorporated "Viruses and E-mail", Jun. 1996, pp. 1-22.
Network Associates Product—Security "PGP Enterprise Security Suite", pp. 1-11, publication date unknown, received from third party on Feb. 26, 2009.
OpenSoft ExpressMail User Manual "Server Configuration", pp. 1-14, publication date unknown, received from third party on Feb. 26, 2009.
OpenSoft Corp. Press Release "OpenSoft and VeriSign Announce Strategic Partnership to Provide customers with S/MIME Solution" Apr. 22, 1996, pp. 1-2.
Exclusive: Shogun SMP server, Sep. 6-19, 1995 (obtained from National Research Council Canada facsimile dated Oct. 15, 2008) 4 pages.
WebShield "Secure Internet Gateway Virus Protection", pp. 1-5, publication date unknown, received from third party on Feb. 26, 2009.
Technical FAQ's "Updates and Patches", 3 pages, publication date unknown, received from third party on Feb. 26, 2009.
Technical FAQ "Technical Note—How can MAILsweeper inform multiple addresses?", 1 page, publication date unknown, received from third party on Feb. 26, 2009.
"GlobalKey Chooses RSA Technology to Secure First Real-Time Communications Environment", Jun. 10, 1996, pp. 1-3.
"Enterprise solutions Announces RSA Mail", Jan. 12, 1994, pp. 1-2.
Costales, B. with Allman, E., "sendmail Second Edition", 1997, 1993 O'Reilly & Associates, Inc., Table of Contents & Chapter 20 only, 31 pages.
Check Point Fire Wall-1™ White Paper, Version 3.0, Jan. 1997, pp. 1-47.
National Software Testing Laboratories "NSTL Final Report for Trend Micro Incorporated Comparison Testing of Anti-Virus Products", Jun. 1997, pp. 1-3.

(56) References Cited

OTHER PUBLICATIONS

Gale Group Computer Product Announcement "Anti-virus Intel meets virus challenge, lowers total cost of PC networks", Nov. 18, 2006, 2 pages.
Gale Group Computer Product Evaluation "Four anti-virus products get the bugs out", Oct. 6, 1997, pp. 1-7.
Crocker, D., "Standard for the Format of ARPA Internet Text Messages", Dept. of Electrical Engineering, University of Delaware, Newark, Aug. 13, 1982, pp. 1-99.
Costales, Bryan and Allman, Eric, "Help for UNIX System Administrators," Sendmail, $2^{nd}$ Edition, O'Reilly & Associates (1997), Ch. 20, pp. 285-302 (received from third party).
Costales, Bryan and Allman, Eric, "Building, Installing and Administering Sendmail," Sendmail, $3^{rd}$ Edition, O'Reilly & Associates (2002), Appendix D, pp. 1161-1172 (received from third party).
Supplemental European Search Report for App. No. 989390978.6 dated Jun. 30, 2005.
Kohno, Masaru; Takano, Kazuo; Yoshida, Kazuki and Ogata, Tsutomu, Deterioration Forecast of Sealed Lead-Acid Batteries by Discharge of Short Time, Shingaku Sogo Taikai B-477, 1996.
Tong, Fangwei; and Yoshihiko, Akaiwa, Residual Timing Error Dependence on Weighting Parameters for Autonomous Timing Synchronization Methods; Kyushu Institute of Technology, Shingaku Sogo Taikai, B-477, 1995.

\* cited by examiner

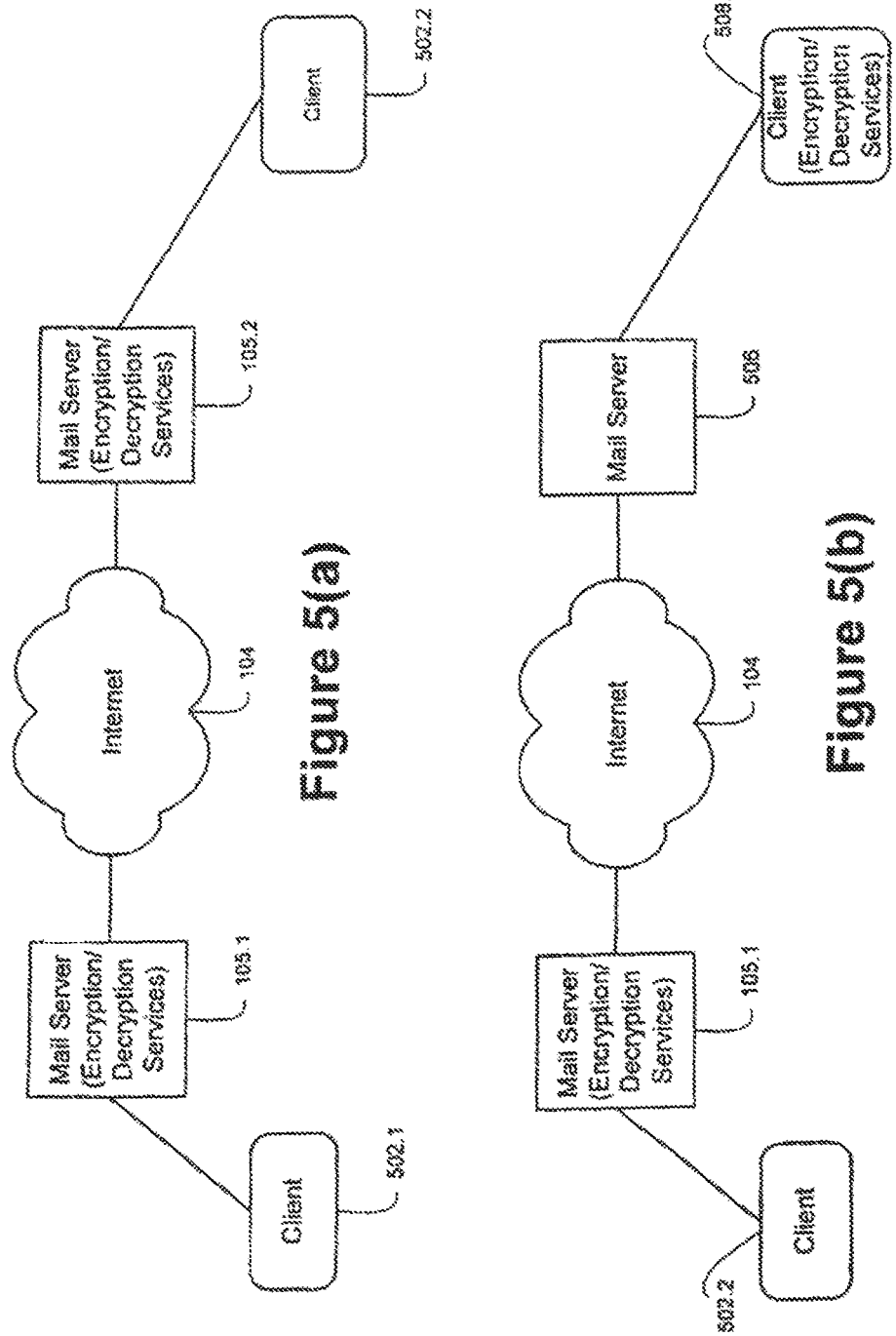

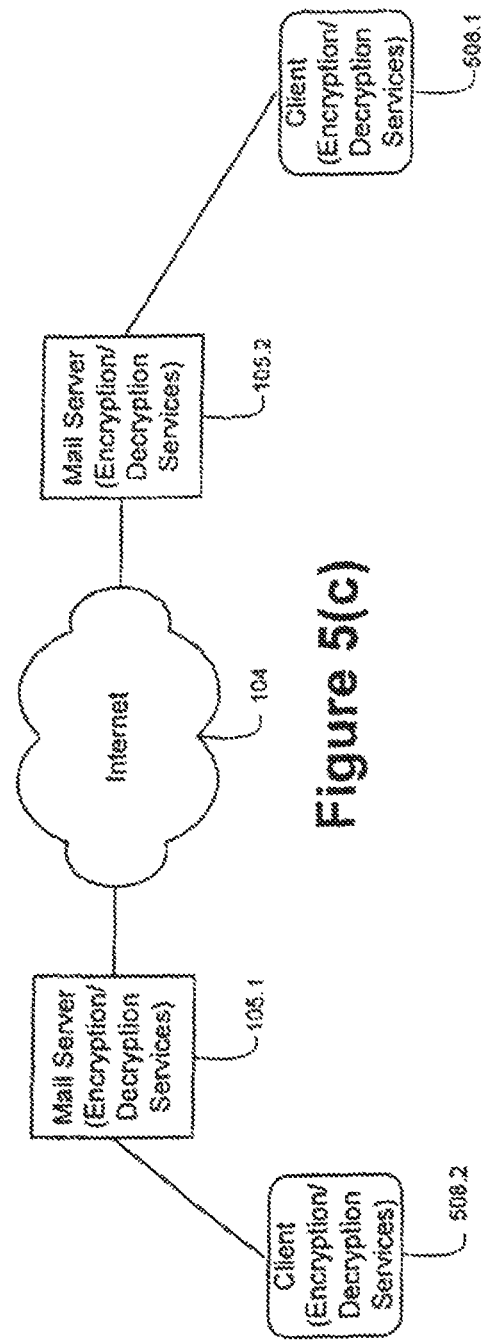

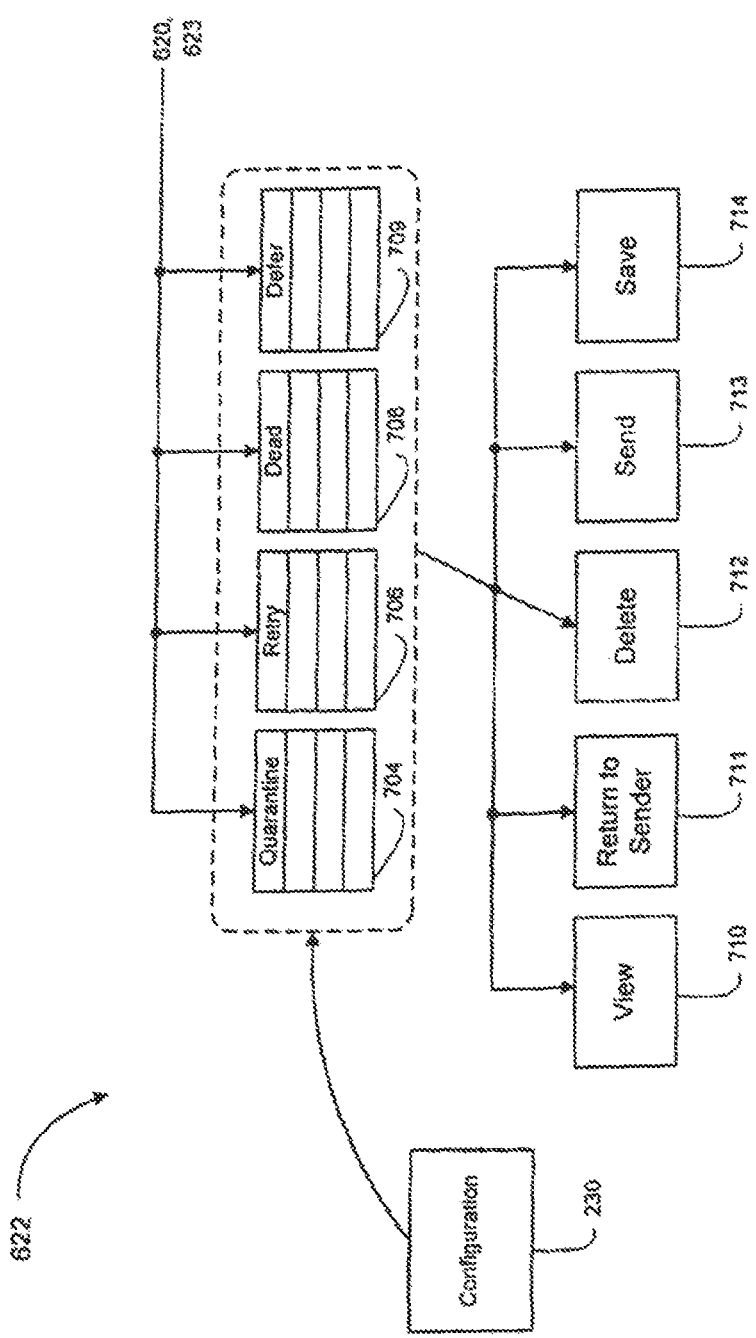

METHOD AND SYSTEM FOR MESSAGING SECURITY

CROSS-REFERENCE TO RELATED APPLICATION(S)

This application is a continuation of U.S. patent application Ser. No. 12/172,819, filed on Jul. 14, 2008, now U.S. Pat. No. 8,407,780, which is a continuation of U.S. patent application Ser. No. 11/522,012, filed 14 Sep. 2006, now U.S. Pat. No. 7,401,356, which is a continuation of U.S. patent application Ser. No. 09/887,313, filed 22 Jun. 2001, now U.S. Pat. No. 7,127,741.

In addition, this application is related to U.S. patent application Ser. No. 09/180,377, filed 23 Jul. 1998, which was the National Stage of International Application PCT/US98/15552 and issued as U.S. Pat. No. 6,609,196, and which claims priority to U.S. Provisional Application 60/053,668, filed 24 Jul. 1997. Application Ser. Nos. 12/172,819, 11/522,012, 09/887,313, 09/180,377 and 60/053,668 are each incorporated herein by reference.

BACKGROUND

Field of the Invention

This application pertains generally to the field of computer security and more specifically to security for electronic mail systems.

Description of the Related Art

The widespread use of electronic mail (e-mail) and groupware applications coupled with the growth and ubiquity of the Internet have opened new avenues for business level communications and electronic commerce. Organizations are increasingly relying on e-mail for the transfer of critical files such as purchase orders, sales forecasts, financial information, and contracts, both within the organization and, increasingly, with other organizations via the Internet. In this setting, these files are now tangible information assets that must be protected.

A number of conventional security measures exist to ensure the confidentiality and integrity of modern data communications. For example, traditional firewalls prevent network access by unauthorized users. Secure sockets technology allows for data to be passed securely over the World Wide Web (WWW). E-mail, however, which is by far the most prominent application over the Internet, still remains problematic, from a security standpoint, for most organizations. Many traditional firewalls simply limit access to information protected by the firewall but do not contain the capability to limit transfer of information, into or out of an organization, by way of e-mail. This can lead to inadvertent or deliberate disclosure of confidential information from e-mail originating within an organization and introduction of viruses from e-mail entering an organization.

One solution to protecting confidentiality of e-mail messages is by encrypting such messages. Further security is available by way of digital signatures, which provide for authentication of e-mail messages senders. Encryption and authentication are both supported in the S/MIME (Secure/Multipurpose Internet Mail Extensions) messaging protocol defined in documents generated by the Internet Engineering Task Force (IETF) entitled "S/MIME Message Specification" (1997) and "S/MIME Certificate Handling" (1997). Individual users can encrypt/decrypt and authenticate e-mail messages using commercially available software. However, the configuration, installation and use of software to perform such tasks is often complex and therefore can detract from the inherent ease of use of e-mail as a means of communication. Moreover, an organization wishing to use such software must rely on individual users to encrypt all necessary messages without means of any centralized control. In addition, many conventional firewalls contain no capability to control the content or format of certain messages that enter or exit an organization. For example, many conventional firewalls contain no capability to ensure that e-mail meeting certain criteria such as content or source and/or destination address or domains, is encrypted. In addition, many conventional firewalls contain no capability to control unwanted messages entering an organization such as unsolicited e-mail advertising.

There is accordingly a need for an e-mail firewall that provides improved centralized control over e-mail messages exiting and entering an organization.

SUMMARY

In a principal aspect, the present invention provides an e-mail firewall for screening e-mail messages originating in, or entering into a computer network. Embodiments employing the principles of the present invention advantageously take the form of an e-mail control system that controls e-mail messages transmitted from and received by a computing site. The e-mail control system includes a message encryptor, which encrypts, in accordance with at least a first stored encryption key, a first designated type of message transmitted from the computing site. A message decryptor decrypts, in accordance with at least a second stored encryption key, a second designated type of message, which is received by the computing site. A filter monitors messages, after decryption by the decryptor and before encryption by the encryptor, in accordance with changeable filter information.

In one embodiment, the invention provides an e-mail firewall, which cooperates with a remote publicly accessible security server to securely transmit e-mail messages. The system includes a message encryptor, which encrypts an e-mail message in accordance with at least one encryption key. The system further includes a lookup module, which queries the remote security server for an encryption key (including related encryption data), associated with at least one target server for the e-mail message. Finally, the system includes a transmission module, which transmits the e-mail message to at least one target server, for which encryption data was retrieved by the lookup module. Optionally, the system includes a signature lookup module to retrieve signatures associated with the e-mail message source (sender or system). The signature is then applied to the e-mail message to allow for the recipient to authenticate the message source.

In another embodiment, the invention facilitates an e-mail message transmission method. The method receives an e-mail message into a transmission server. The e-mail message is associated with at least one recipient server, which is coupled to the transmission server by a network connection. The method retrieves encryption data corresponding to at least the recipient server by accessing a lookup server, which is coupled to the transmission server by a network connection. The method then encrypts the e-mail message in accordance with the retrieved encryption data. Finally, the method transmits the encrypted e-mail message to the recipient server.

In yet another embodiment, the invention provides an e-mail message reception method. The method receives an encrypted e-mail message from a remote server. The method decrypts the e-mail message is accordance with encryption data. The method then extracts digital signature data from the e-mail message. Next, the method verifies the extracted signature by accessing a signature verification server. Finally, the method processes the e-mail message in accordance with the results of the verifying step. Alternatively, the method employs a local repository of signatures to verify signed e-mail messages.

BRIEF DESCRIPTION OF THE DRAWINGS

The present invention may be better understood, and its numerous objects, features, and advantages made apparent to those skilled in the art by referencing the accompanying drawings.

FIGS. 5(a), 5(b) and 5(c) are block diagrams illustrating alternative secure e-mail communication mechanisms;

FIG. 7 is a block diagram showing further details of a portion of FIGS. 6(a) and 6(b);

DESCRIPTION OF THE PREFERRED EMBODIMENT(S)

Figure 1:
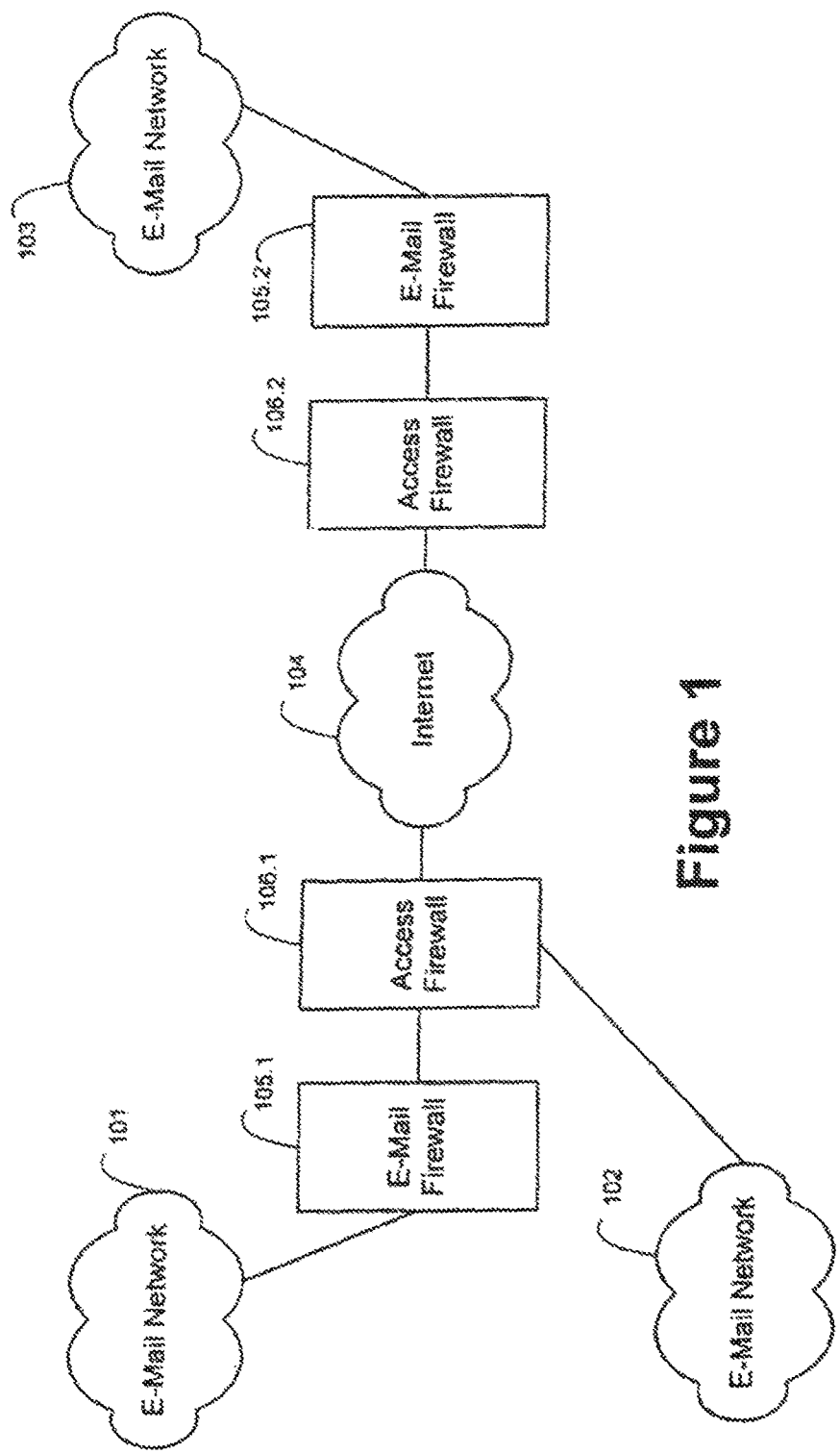
FIG. 1 of the drawings is a block diagram showing a plurality of e-mail networks which are coupled by way of the Internet, and which employ an e-mail firewall employing the principles of the present invention.

In FIG. 1 of the drawings, e-mail networks 101 and 102 are coupled to e-mail network 103 by way of a Wide Area Network (WAN) 104 such as the Internet. Disposed between the internet 104 and e-mail network 101 and 103 are an access firewall 106 and an e-mail firewall 105. E-mail network 102 is coupled to Internet 104 only by access firewall 106.1. E-mail networks 101, 102, and 103 may each take a conventional form. For example, e-mail networks 101-103 may take the form of a Local Area Network (LAN) or a plurality of LANs which support one or more conventional e-mail messaging protocols. Access firewalls 106 may also take a conventional form. Access firewalls 106 operate to limit access to files stored within a computer network, such as e-mail networks 101-103, from remotely located machines. E-mail firewalls 105 (individually shown as 105.1 and 105.2) advantageously take a form as described in further detail herein to control transmission of electronic mail messages between an internal site and one or more external sites. An internal site for e-mail firewall 105.2, by way of example, may take the form of e-mail network 103. External sites for e-mail firewall 105.2 are any sites not contained in e-mail network 103. For example, external sites for e-mail firewall 105.2 are any sites in e-mail networks 101 and 102 as well as any other sites coupled to Internet 104.

E-mail firewall 105 is preferably positioned on the "safe-side" of the access firewall 106. FIG. 1 should be understood as showing, by way of an example, the principles of the embodiments described herein. The access firewalls 106 are shown only for purposes of explanation and are not required for operation of embodiments employing the principles of the present invention.

Preferably the e-mail firewall 105 takes the form of a program executing on a conventional general purpose computer. In an exemplary embodiment, the computer executes the Windows NT or Windows 2000 operating systems available from Microsoft Corp., of Redmond, Wash. In other embodiments, the computer executes a Unix operating system such as Solaris from Sun Microsystems, of Mountain View, Calif. Although e-mail firewall 105 is shown in FIG. 1 as operating on e-mail messages between an internal site and an external site, the e-mail firewall 105 may also be used to exchange messages between two internal sites for computer networks with SMTP compliant messaging backbones.

Figure 2:
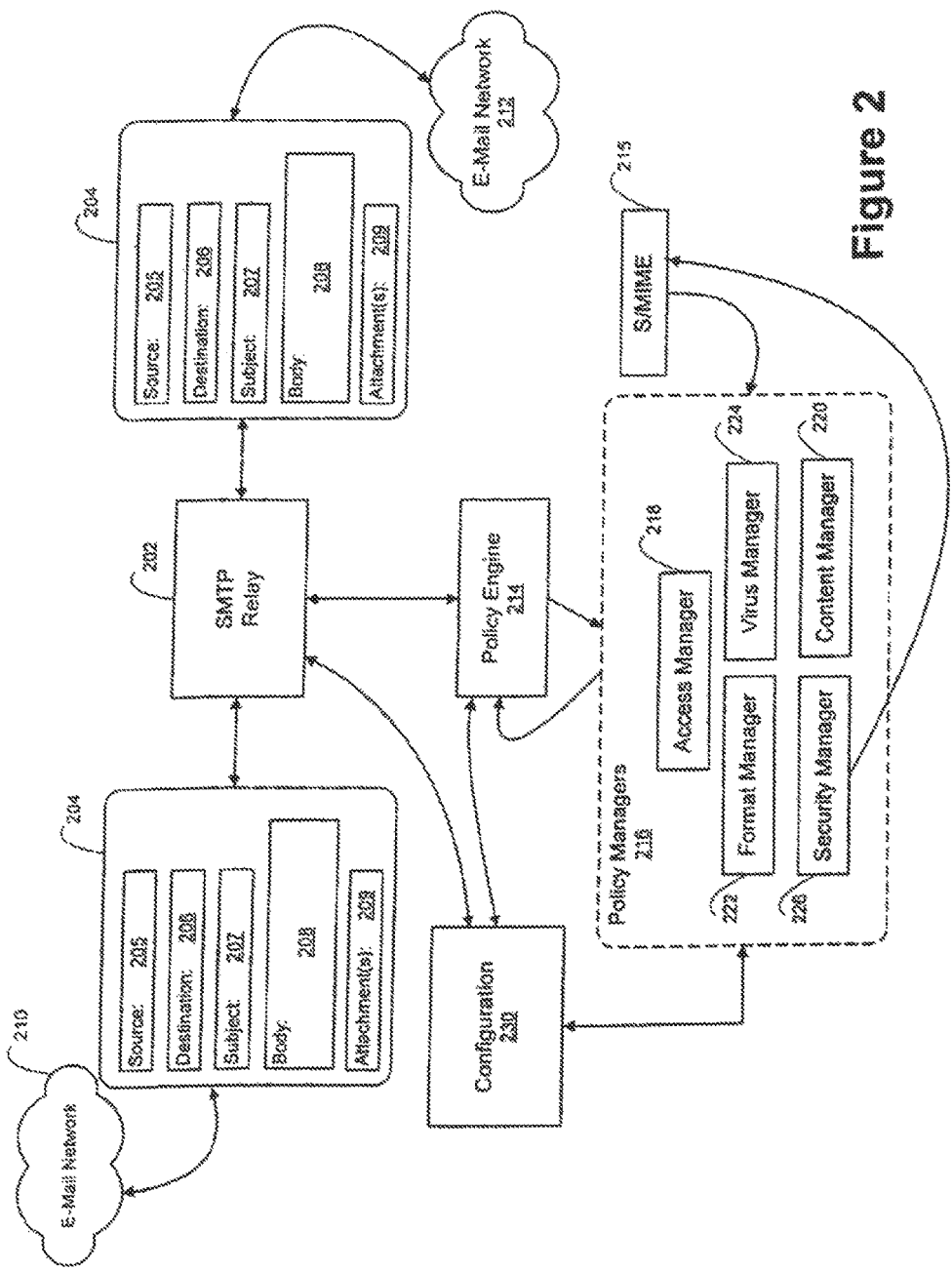
FIG. 2 of the drawings is a block diagram of a preferred embodiment of an e-mail firewall.

FIG. 2 of the drawings illustrates in block diagram form the major functional components of e-mail firewalls 105.1 and 105.2. In FIG. 2, a Simple Mail Transfer Protocol (SMTP) relay module 202 performs the functions of a conventional SMTP relay host. An example of an Internet relay host is a UNIX Send mail program. The SMTP relay module 202 transmits and receives e-mail messages such as shown at 204 to and from an internal site 210 and external sites 212. E-mail message 204 takes the form of a conventional e-mail message which contains a plurality of user specified information fields, such as source field 205 specifying an e-mail address for the source of the message 204, a destination field 206 specifying one or more destination e-mail addresses for the message 204, a subject field 207 specifying a subject for the message 204, a body field 208 specifying the body of the message 204 containing textual and/or graphics data, and an optional attachment field 209, specifying one or more flies to be transmitted with the message 204. Other user specified fields include, but are not limited to, priority of the message, identity of the sending agent, and the date and time of the message.

E-mail message 204 may be encoded in accordance with one of a plurality of encoding formats as explained in further detail below. SMTP relay module 202 preferably takes a conventional form of a software module which receives and transmits e-mail messages in accordance with the Simple Mail Transfer Protocol as specified by 'Internet RFC 821.' The SMTP protocol is not critical to the invention. In other embodiments, the SMTP relay module is replaced with a module that receives and/or transmits messages in other formats such as the File Transfer Protocol (FTP), the Hyper-Text Transfer Protocol (HTTP), the Network News Transfer Protocol (NNTP), or the Internet Relay Chart (IRC).

In one embodiment, the SMTP relay module 202 is configured to use the Domain Name System (DNS) to determine routing to message recipients or alternatively is configured to relay messages to at least one administrator specified SMTP host. If DNS is selected, at least one SMTP host is specified to allow for default message forwarding even if DNS service is not available. The routing option can be overridden on a per-domain basis. The SMTP relay module 202 advantageously allows inbound and outbound SMTP connections to be limited from or to specific hosts and allows connections to or from specific SMTP hosts to be denied. Preferably, the SMTP relay module 202 transmits messages that include text messages and binary data e-mail messages, as is known in the art. The following illustration refers to a generic routing server, which facilitates some of the functionality provided by the SMTP relay module 202 to transmit e-mail messages in accordance with the invention.

As discussed above, the SMTP relay module 202 receives data identifying intended recipients for a subject e-mail message. Preferably, the data includes e-mail addresses for the intended recipients. The SMTP relay module 202 receives data identifying in e-mail message for the intended recipients. Example e-mail messages include combinations of, or individual, text messages, graphical image data, audio data, video data, meta data, database records, binary data, executables, and compressed archives.

In another embodiment, the SMTP relay module 202 also receives delivery parameters, such as message priority, and other optional parameters for the e-mail message. In one embodiment, a security preference specifies that servers cooperating in the delivery of the e-mail message should employ secure transmission protocols. The SMTP relay module 202 preferably stores the e-mail message in a temporary location before transmission. In one embodiment, the e-mail message is routed separately to each intended recipient. In some embodiments, routing optimization takes place if the routing server detects that two or more recipients are associated with a common server. Accordingly, a single copy of the e-mail message is routed to the recipient's server, indicating that the e-mail message is intended for multiple recipients.

Figure 3:
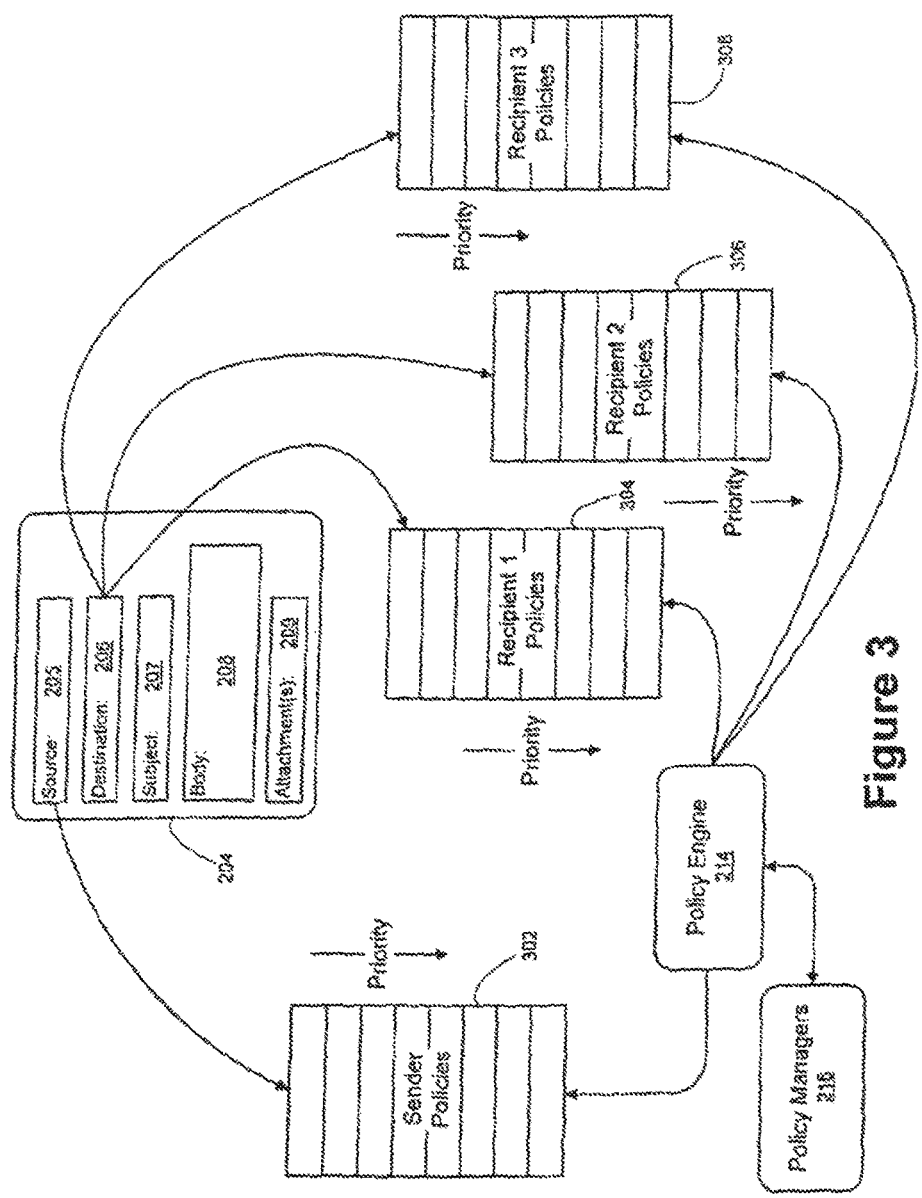
FIGS. 3 and 4 are block diagrams illustrating further details of operation of the e-mail firewall of FIG. 2.

FIG. 3 illustrates the manner in which messages received by the SMTP relay module 202 from internal site 210 and external site 212 are processed by policy engine 214. Policy engine 214 accepts messages from SMTP relay module 202 and determines which policies are applicable to a message by building a list 302 of sender policies for the sender (source) 204 of the message, and building a list 302, 306, and 308 of recipient policies for each recipient. The policy engine 214 then calls the policy managers 216 to apply each policy. The different types of policies have a predetermined priority in which they are applied. For example, decryption policies are applied before other policies, to allow the policies that operate on the body 208 of the message to be able to access the contents contained therein. In an alternative embodiment, the order in which the policies are applied is selectable by a system administrator. Access manager policies get applied after decryption policies and then the other policy managers are called repeatedly in the order implied by the policies to be applied to the message. The policy engine 214 then receives results from policy managers 216 and transmits messages to SMTP relay module 202 in accordance with the received results. The results received by the policy engine 214 comprise actions such as disposition, annotation, and notification described in further detail herein. The result of processing of a message 204 by policy engine 214 can result in generation of a plurality of additional messages, for example, for notification to the sender or recipient, or to the system administrator. In a preferred embodiment, the policy engine 214 is implemented as a program executed by a digital computer.

Policy managers 216 operate to enforce policies entered by an administrator of e-mail firewall 105. Policy managers 216 preferably comprise a plurality of modules for enforcing administrator configured policies, directed to specific aspects of e-mail messages. For example, in e-mail firewall 105, policy manager 216 implements a plurality of manager modifies including an access manager 218, a content manager 220, a format manager 222, a virus manager 224, and a security manager 226. Policy managers 216 are preferably developed by inputs entered by an administrator by way of configuration module 230. Configuration module 230 also operates, in response to information entered by an administrator, to configure SMTP relay 202 and policy engine 214. The policy managers shown in FIG. 2 and described herein are merely illustrative of an exemplary embodiment. Other types of policy managers are contemplated as being within the principals described herein.

Access manager 218 provides enforcement of access control policies such as destinations to which e-mail is prohibited from being sent, or sources from which e-mail cannot be received. Access manager 218 can also filter messages that exceed a maximum message size determined by an administrator, or which contain specific words in the subject field 207 of the message. Access manager 218 can also filter a message by the priority of the message specified by the user. For example, high priority messages can be passed through immediately, while low priority messages are stored in a queue (explained in further detail in connection with FIG. 7). Access manager 218 can also filter messages by the date and/or time of transmission of the message. For example, messages transmitted between certain hours of the day or on certain days, such as weekends or holidays may be retained or further filtered by, for example, content manager 220.

Content manager 220 supports the enforcement of content control policies. Preferably content manager 214 supports filtering by one or more of the following criteria: (a) specific words, or word patterns, in the body 208; (b) specific words in the subject 207; (c) attachment 209 (all or by name/type); (d) specific words, or word patterns, in the attachment 209. Content control policies, and other appropriate policies, can also be specified to require certain material, such as for example, certain notices or disclaimers. Virus manager 224 supports the enforcement of virus control policies by detecting virus infected e-mail attachments. Virus manager 224 preferably detects viruses contained in a plurality of compressed file formats including PKZip, PKLite, ARJ, LZExe, LHA, and MSCompress. Virus manager 224, by way of example, may use a commercially available virus scanning engine. Virus manager 224 also preferably applies policies on "clean messages," that is, messages that have been scanned for a virus and found to be tree of any viruses. In this embodiment, a "clean stamp" annotation is added to such messages, indicating that no viruses were detected.

Format manager 222 provides conversion of an e-mail message from a first format to a second format. In a preferred embodiment, format manager 222 converts message from conventional UUENCODE format to MIME format. Preferably format manager 222 converts messages prior to message processing by other policy managers.

Security manager 226 preferably enforces a plurality of e-mail encryption policies. Preferably, security manager 226 enforces a client security usage policy, a preserve encryption policy, a plain text access policy, and default action policies. Security manager 226 also applies on behalf of users proxy encryption and signature policies, as discussed in further detail in connection with FIG. 5(*b*).

In one embodiment, client security usage policies specify that certain users, under certain conditions, should perform encryption or signature, or both, at the desktop. Additional criteria can be set to indicate when this policy should be enforced. For example, an e-mail from a company's CEO to the company's legal counsel by the domain or full e-mail address can be specified to require either encryption, signature, or both, to enforce attorney-client privilege and to preserve encryption policies. Moreover, client security usage policies can be used to specify that messages, which are already in encrypted form and perhaps meet some other criteria, should be preserved. Thus, such messages are not processed, modified, or encrypted by the e-mail firewall 105. Furthermore, the security policy may also select varying encryption methods as a result of applying policy to transmitted e-mail. Plain text access policies require that the e-mail firewall 105 is designated as a recipient on certain types of specified messages. The e-mail firewall 105 is designated as a recipient on encrypted message in order to apply access, content, virus, and other policies on the message. Plain text access policies can also be used to send a signed notification to the sender of a message as a way of providing the sender with the e-mail firewall's 105 public key. Default action policies indicate the action to be taken on messages, which are not encrypted and will not be encrypted by the e-mail firewall 105, and which might meet some other criteria. The default action policy type is used to ensure that certain messages get encrypted somewhere, whether at the desktop or by the e-mail firewall 105.

Figure 4:
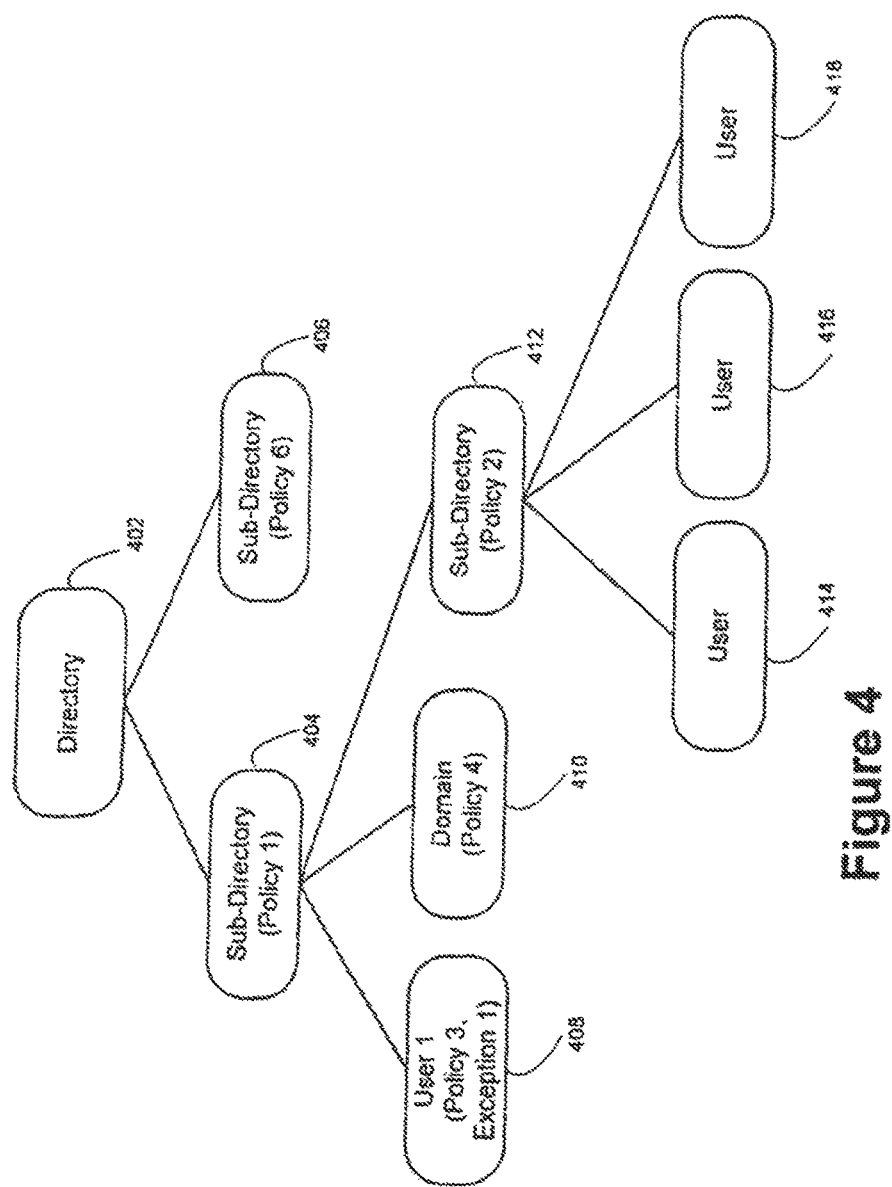

Policies are preferably entered by an authorized administrator by way of configuration module 230 which preferably takes the form of a program executing on a stored program computer. Policies can advantageously be applied to users, either individually or by e-mail domains or other groupings. FIG. 4 shows an example of how policies are applied. Users can be organized in a hierarchical directory-type structure to facilitate grouping of users and/or domains. If a policy is applied to a given directory then sub-directories corresponding to the given directory inherit such policies. For example, in FIG. 4, policy 1 applies to sub-directory 404 and thus applies to all sub-directories, domains and users, such as sub-directory 412, user 408, and domain 410, corresponding to sub-directory 404, unless that policy is explicitly overridden by another policy applied to a particular sub-directory or to an intervening sub-directory. For example, policy 3 will override policy 1, for users shown at 408, where there are conflicts between policy 1 and policy 3, and will supplement policy 1, where there are no conflicts. Exception 1 will override policies 1 and 3 for the particular exception specified in exception 1. As further shown in FIG. 4, policy 1 applies to users 414, 416, and 418, and is overridden by policy 2 for users 414, 416, and 418 in the event of conflicts, and is supplemented where there are no conflicts. This advantageously allows policies to be easily applied to groups of users. The exact manner in which the policies are stored is not critical and a variety of means and formats of storage may be employed.

E-mail messages 204 received and/or transmitted by SMTP relay 202 are preferably encoded in accordance with the S/MIME (Secure/Multipurpose Internet Mail Extension) protocol, as specified by the Internet Engineering Task Force in documents entitled "S/MIME Message Specification" (1997) and "S/MIME Certificate Handling" (1997). Advantageously, the S/MIME protocol builds security on top of the industry standard MIME protocol according to Public Key Cryptography Standards (PKCS) specified by RSA Data Security, Inc. S/MIME advantageously offers security services for authentication using digital certificates, and privacy, using encryption. Digital certificates are preferably implemented in accordance with the X.509 format as specified in "Information Technology—Open Systems Interconnection—The Directory: Authentication Framework," also known as "ITU-T Recommendation X.509" (June 1997). Encryption is preferably performed by one of the following symmetric encryption algorithms: DES, Triple-DES, RC2, and other algorithms introduced by revisions of the S/MIME standard. The S/MIME protocol is well known and widely used and provides encryption and digital signatures and is therefore preferable as a communications protocol. The precise details by which the protocol operates is not critical. Moreover, it should be understood that other secure messaging protocols such as PGP (Pretty Good Privacy) or Open PGP, as specified by the ITF working group, may also be used.

Access manager 218 is the first policy manager to process e-mail message 204. Access manager 218 operates only on message header information which is not encrypted. Thus, access manager 218 may operate on an e-mail message 204 prior to decryption by S/MIME engine 215. The term "message header information" generally refers to portions of message excluding the body 208 (and commonly referred to as message text), and attachments 209. Thus, the header information includes the source, destination and subject fields (205, 206, 207). Optional header fields include date/time stamp, priority, and sending agent. The remainder of the modules operate on the message 204 after processing by S/MIME engine 215. As previously noted, format manager 222 preferably operates on messages prior to operation by other managers such as virus manager 224, security manager 226, and content manager 220.

The S/MIME protocol allows two sites which support the S/MIME protocol to exchange secure e-mail messages 204. A type of virtual private network (VPN), as shown in FIG. 5(*a*), can be achieved if both the transmitting and receiving site perform S/MIME functions. The resulting VPN, termed herein an "object level e-mail VPN," provides encryption/signature and/or decryption/verification of messages between transmitting and receiving site(s). In the object level e-mail VPN shown in FIG. 5(*a*), each object (message) is encrypted individually and sent over a standard (SMTP) transport medium, where each object (message) is decrypted at the other end. Advantageously, the object level e-mail VPN does not require a secure real-time connection as required by conventional VPNs. As shown in FIG. 5(*a*), mail servers 105.1 and 105.2 perform functions described herein for e-mail firewall 105, and as a result, achieve an object level e-mail VPN between them. E-mail that is encrypted and transmitted between serves 105.1 and 105.2 is protected from disclosure to third parties, despite the fact that e-mail transmitted via the Internet 104 may pass through numerous unsecured servers before reaching its destination. Accordingly, one may appreciate that it is not required for the intermediate e-mail relay servers between servers 105.1 and 105.2 to support encryption or decryption of messages.

In one embodiment, in such an exchange, e-mail firewalls 105.1 and 105.2 provide key pair and public key certificate generation and provide automated or manual public key certificate exchange with the other S/MIME server. In addition, e-mail firewalls 105.1 and 105.2 allow: identification of the other S/MIME server through directory domain records, association of directory domain records with server certificates and selection of encryption/signature algorithms and key lengths. The directory domain records, and the directory user records referred to below, are as described in FIG. 4.

Exchange of S/MIME encoded messages may also be performed between the e-mail firewalls 105.1, 105.2 and an S/MIME client coupled in a server that does not perform S/MIME functions. FIG. 5(*b*) illustrates an exchange between e-mail firewall 105 and a S/MIME client coupled to a non-S/MIME server 506. In FIG. 5(*b*), server 105.1 encrypts and decrypts messages on behalf of client 502.2 and generally provides the functions described above for e-mail firewalls 105.1 and 105.2. Specifically, in such an exchange, e-mail firewall 105.1 provides key pair and public key certificate generation and provides automated or manual public key certificate exchange with the client 508.1. In addition, e-mail firewall 105.1 allows: identification of the client 508.1 through directly user records, association of directory user records with user certificates and selection of encryption/signature algorithms and key lengths. Client 508.1 provides encryption/decryption services to allow messages to be transmitted securely through server 506 by supporting encryption/decryption services. A specific type of object level VPN, referred to herein as "proxy security," is achieved in FIG. 5(*b*) between the server 105.1 and the client 508.1. In proxy security, at least one client is involved in performing encryption/decryption, such as client 508.1 in FIG. 5(*b*). This is in contrast to the arrangement of FIG. 5(*a*), where the encryption/decryption services performed by servers 105.1 and 105.2 is transparent to the clients 502.1 and 502.2.

In FIG. 5(*a*), communications between servers 105.1 and 105.2 are secure, but communications between clients 502.1 and 502.2 and their respective servers 105.1 and 105.2 are not necessarily secure. In many such installations, security is not necessary because the client 502.1 and the server 105.1 typically communicate over a common LAN, which is protected from the Internet by a standard firewall. However, if such security is desired, the clients 508.1 and 508.2 can also be equipped with encryption/decryption services to perform proxy security, as is shown in FIG. 5(*c*). The servers 105.1 and 105.2 perform the same function described above in connection with FIG. 5(*a*) and therefore achieve an object level VPN. In addition, the clients 508.2 and 508.1 allow secure communications with the corresponding servers 105.1 and 105.2. It should be noted that the encryption/decryption performed by servers 105.1 and 105.2 can be independent of the encryption performed by the corresponding clients 508.2 and 508.1. For example, a message by client 508.2 to client 508.1 may be encrypted when transmitted to server 105.1, decrypted by server 105.1 and subjected to appropriate actions by the policy managers. The message may then be encrypted for transmission to server 105.2, decrypted by server 105.2 and subjected to appropriate actions by the policy managers, and encrypted for transmission to client 508.1 which decrypts the message. Alternatively, a message by client 508.2 to client 508.1 may be encrypted by client 508.2, be subjected to appropriate actions to non-encrypted portions, such as the destination field, and then the entire message, including the portions not encrypted by client 508.2, can be encrypted again by server 105.1 for transmission to server 105.2, which decrypts the encryption by server 105.1, and transmits the message to client 508.1 for decryption of the encryption performed by client 508.2. Several combinations of the foregoing two scenarios are possible. In another embodiment, the client to server connection is protected by means other than object level security such by using a Secure Socket Layer (SSL) connection while the connection between servers is by an object level VPN in accordance with the invention.

Figure 6A:
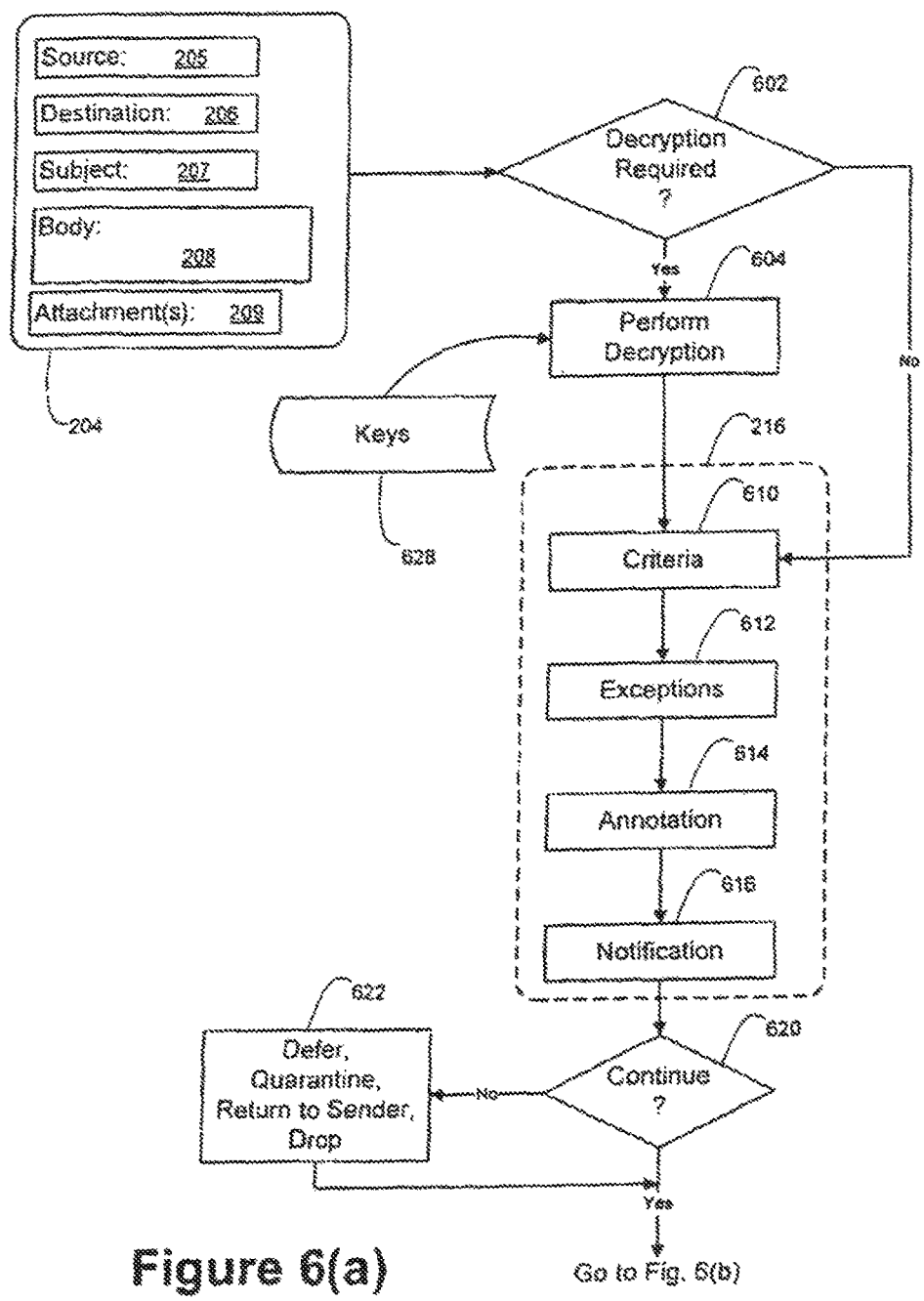
FIGS. 6(a) and 6(b) are flowcharts illustrating operation of a preferred embodiment of an e-mail firewall.

Each e-mail message 204 processed by e-mail firewall 105 is processed in accordance with the steps shown in FIGS. 6(*a*) and 6(*b*). FIG. 6(*a*) is a flowchart showing operation of the e-mail firewall 105 in response to a received message. FIG. 6(*b*) is a flowchart showing operation of the e-mail firewall 105 prior to transmitting a message. The messages processed by e-mail firewall 105 may be received from an internal site for transmission to an internal site, or may be received from an internal site for transmission to an external site, or may be received from an external site for transmission to an internal site. Any single message may include internal and external destinations 206. The steps shown in FIGS. 6(*a*) and 6(*b*) are preferably performed by generation of sender and recipient policies shown in FIG. 3. For multiple destinations, the steps shown in FIG. 6(*b*) may therefore be performed differently and have different results for different destinations.

Turning to FIG. 6(*a*), at 602, the e-mail firewall 105 determines if decryption of portions of the message 204 is required. If so, then at 604, decryption is performed in accordance with stored private keys 628. Storing private keys is well known in the art of public key cryptography. After decryption, or if no decryption is required, the e-mail firewall 105 applies policy managers 216, which can perform four types of actions (shown at 610, 612, 614, 616, and 620) on e-mail message 204 for each policy. Criteria actions 610 present filtering criteria selected by the administrator. Exception actions 612 determine which criteria 610 are excluded. Multiple criteria 610 can be selected which effectively results in a logical AND operation of the criteria. Multiple exceptions 612 can be selected which effectively results in a logical OR operation of the exceptions; that is, any one of the exception conditions being true will result in a policy not being triggered. In another embodiment, a generic Boolean expression is used in lieu of the criteria and exception combination. Annotation actions 614 cause generation of attachment to message 602 or insertion of text into the body 208 of the message. The manner by which annotations are made is based on a policy entered by the administrator. Notification actions 616 cause the sending of one or more e-mail notifications when a given policy is triggered. Notifications can be sent to sender, recipient, administrator, or any e-mail address that is defined by the administrator. In addition, notification actions 616 allow specification of whether the original message 204 should accompany the notification. Disposition action 620 determines whether the message should continue to the destination(s) (specified by field 620) or whether one of a plurality of alternative actions 622 such as deferral, quarantine, return to sender, or dropping of the message are required.

Figure 8:
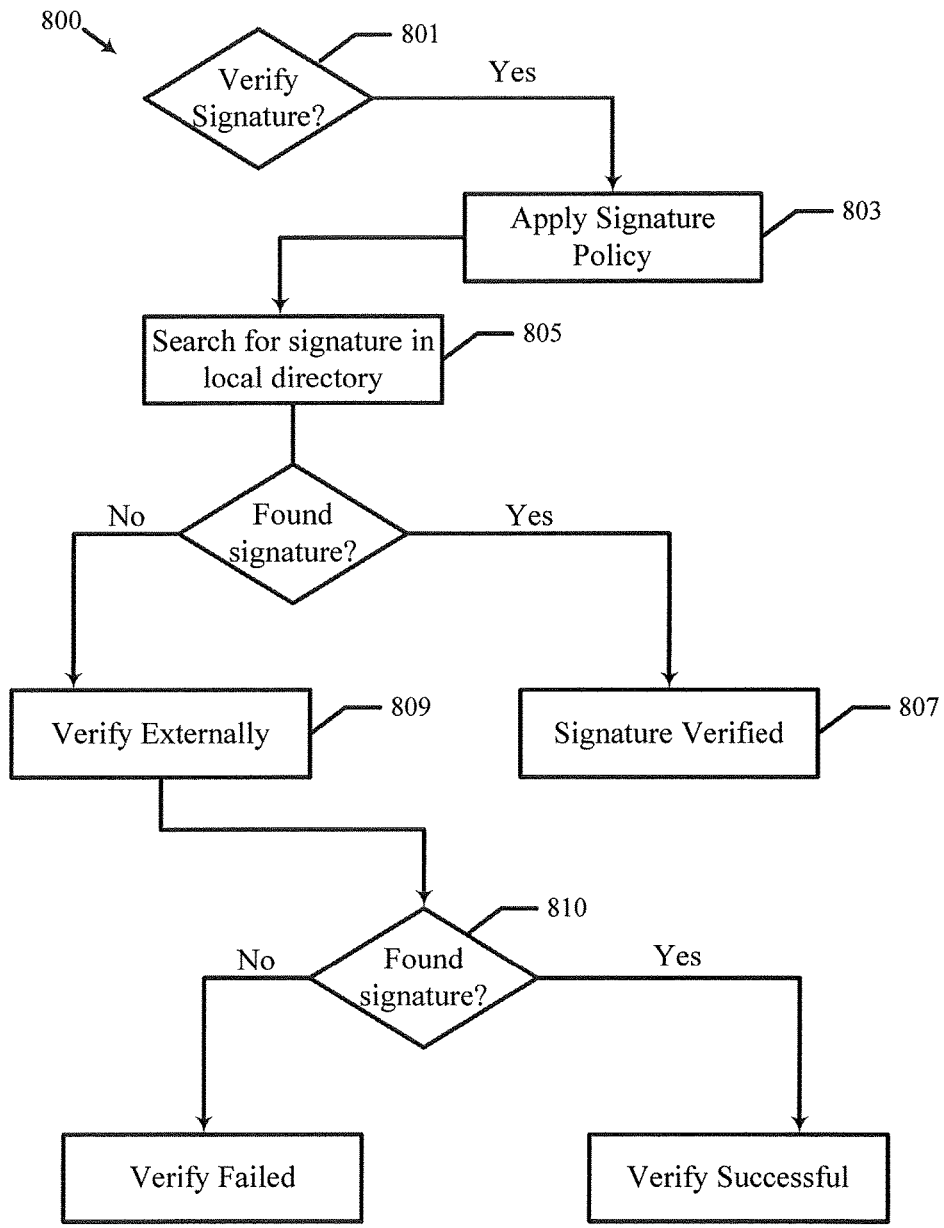
FIG. 8 is a flowchart illustrating a signature verification operation.

In one embodiment, the policy action dictates that a digital signature should be detected and verified in accordance with signature attributes. FIG. 8 illustrates the operation of a signature verification portion of the security manager 226. In one embodiment, the security manager 226 executes a signature verification policy that verifies electronic signatures in received e-mail messages. The verification process preferably starts with identifying that the received e-mail message includes an electronic signature (step 801). In one embodiment, the security manager 226 applies a policy to determine whether the e-mail message is such that the signature should be verified. In other embodiments, the security manager 226 automatically initiates the signature verification process in response to detecting a signature, regardless of the e-mail message attributes. The security manager 226 applies a security policy for the signature (step 803). The security policy preferably specifies the level of verification that is required, based on e-mail message attributes. Once the signature policy is applied to the received e-mail message, the security manager proceeds to verify the signature in accordance with the policy.

The security manager 226 starts by hashing the signed e-mail message to extract a message digest. The signature is then decrypted using the signer's public key, to produce a second message digest, the original message digest. The two message digests are compared to verify that they are identical. The security manager 226 proceeds to verify that the public key used in the verification belong to the sending entity. Such verification is accomplished by verifying the signer's digital certificate, which is included with the signature. As discussed above, the verification level is preferably determined by the security policy that is applicable to the current e-mail message. The policy actions include verifying the signing certificate against a configurable list, verifying the digital certificate validity dates, verifying the key strength and algorithm allowed by the certificate, verifying the certificate usage (i.e., can the certificate be used for signing), verifying the certificate chain, verifying that the root certificate is in a list of acceptable root certificates, and verifying that the certificate is not revoked.

In one embodiment, the digital certificate verification is simplified by querying a local directory of acceptable signing digital certificates, followed by the querying of one or more trusted remote servers. The security manager 226 searches for the digital certificate in a local directory, which stores trusted digital certificates that do not require full verification (step 805). If the digital certificate is located in the local trusted digital certificate directory, the signature verification process is reported as successful (step 807). If the digital certificate is not in the trusted digital certificate directory, the server proceeds to search for the digital certificate in one or more trusted remote directories (step 809). If the security manager 226 receives the digital certificate from one of the trusted remote directories, the signature is deemed valid (step 810). The security manager 226 provides a corresponding result notification to the policy manager so as to facilitate proper follow up actions, such as rejection or acceptance of the e-mail message. In one embodiment, the notification is in the form of a text message that is appended to a received message.

In another embodiment, one or more trusted signature verification servers are used to verify signatures so as to provide for the off-loading of complex signature verification operations from the e-mail firewall. One may appreciate that the digital signature verification operation consumes substantial processing power of the e-mail firewall, as well as adding administrative burden, because of the need to maintain root certificates, intermediate certificates, acceptable signing certificates, and certificate revocation lists (CRLs). Accordingly, in this embodiment, the security manager hashes the e-mail message and submits the resultant data to the signature verification server for performing the verification externally. In one embodiment, the data includes the computed hash, the signature information (including the hash as encrypted by the sender and signing digital certificate), and policy data, which indicates the required verification level. The signature verification server receives the data from the security manager and processes the data substantially as the local security manger does in the previously discussed embodiment. Such processing includes verifying certificate validity dates, certificate usage, certificate chain, certificate non-revocation, and root certificate. After determining whether the signature is valid, the verification server transmits a corresponding response to the security manager 226 of the e-mail firewall. The e-mail firewall proceeds in accordance with actions, as dictated by the applicable policy and verification results.

In one embodiment, the signature verification server is a trusted server and the communication between the e-mail firewall and the signature verification server is authenticated. In this embodiment, the secure connection is facilitated by an SSL connection or by requiring the signing verification server to sign the response. Although the authentication method requires the e-mail firewall to verify a signature, such verification does not draw much processing power since the e-mail firewall employs a known set of signature verification serves and accordingly can locally store the verification certificates. Preferably, the communication protocols used by the e-mail firewall and the signature verification server include XML, ASN.1 encoding, and MIME.

Referring now back to FIG. 6(*b*), the illustrated steps are performed for each destination specified for a message 204. The steps shown in FIG. 6(*b*) are also performed for messages generated by step 622. First, policy managers 216 perform actions 610, 612, 614 and 616, for each destination specified in the message 204. Disposition action 623, operates similarly to disposition action 620 by determining whether the message should continue to the destination(s) or whether one of a plurality of alternative actions 622 such as deferral, quarantine, return to sender, or dropping of the message, are required. At step 624, a determination is made if encryption or signature is required. If encryption is required, then at step 626 encryption is performed in accordance with stored keys 628. If a signature is required, a signature is added at step 629. Notice that some implementation may instead choose to sign before encrypting. The message is then transmitted to the specified destination at step 630. Messages that are processed by block 622 are also checked at step 624 before transmission. For example, messages that are defined, quarantined, or returned to the sender, may need to be encrypted or include a signature.

Figure 9:
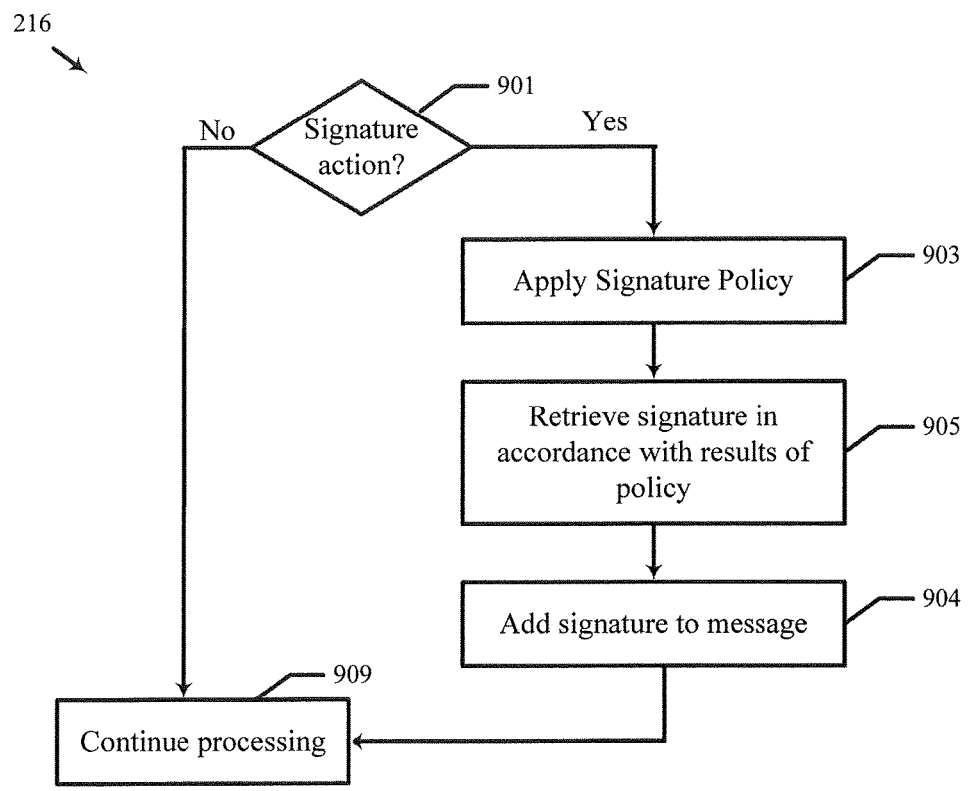
FIG. 9 is a flowchart illustrating a signature insertion operation.

FIG. 9 illustrates a signing operation, which is preformed by the security manager 226 when processing an e-mail message for transmission. The process illustrated in FIG. 9 is for adding a signature to an e-mail message in accordance with policy determinations as applicable to step 629 in FIG. 6(*b*). Applying signatures to e-mail messages is well known in the art, as is discussed in the S/MIME Standard. The e-mail firewall has available a signature inclusion policy for defining the e-mail messages to which a signature is added (step 901). The e-mail firewall determines if the e-mail message is such that a signature is added. In one embodiment, an e-mail firewall policy refers to the e-mail message textual content, destination, source, and size, in determining whether a signature is required. If a signature is required for the e-mail message, the security manger 226 applies a signature selection policy so as to indentify a corresponding signature for the e-mail message (step 903). The security manager 226 retrieves a signature in accordance with the signature selection policy (step 905). The signature is applied to the e-mail message (step 904). The e-mail message is then preferably forwarded to the policy managers for further processing (step 909).

Figure 10:
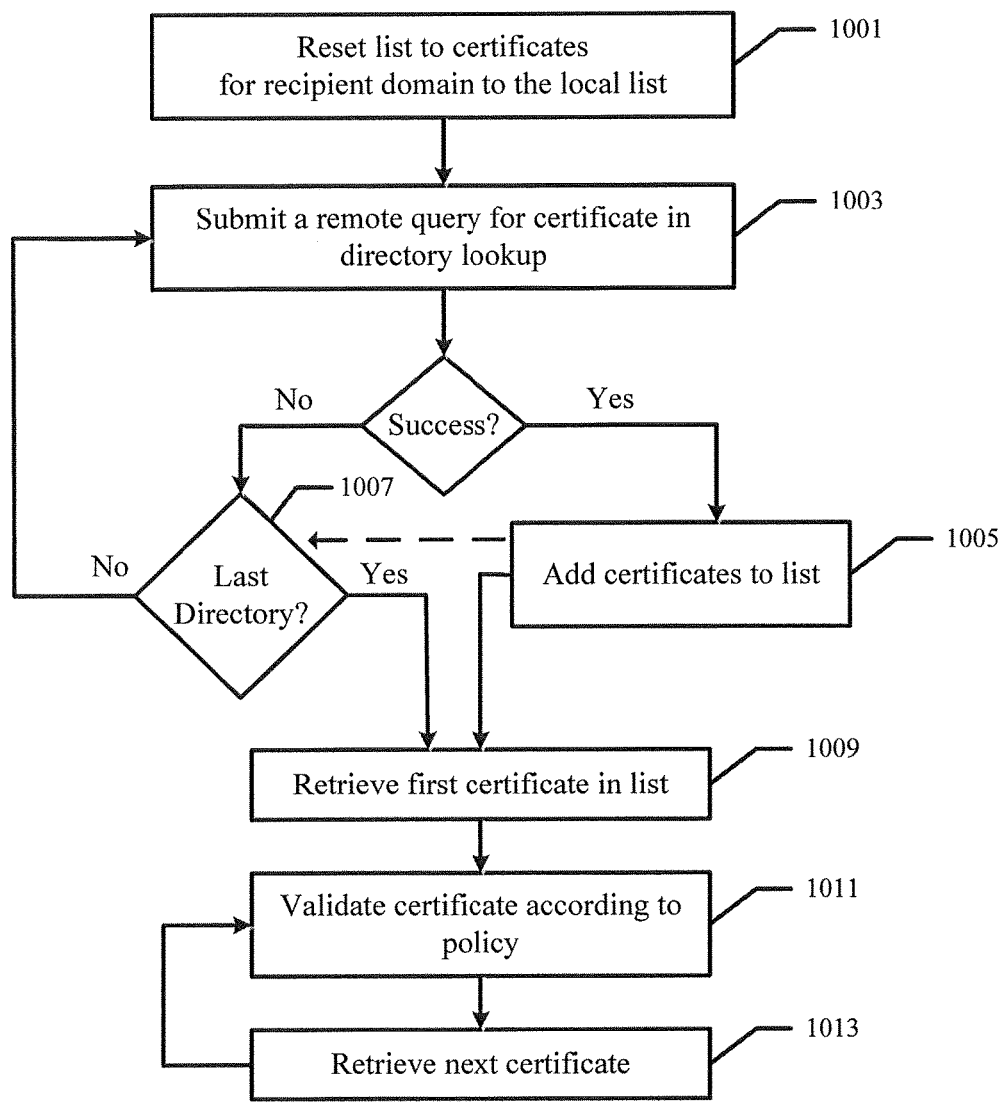
FIG. 10 is a flowchart illustrating certificate lists generation.

When encryption is required, the security manager 226 retrieves corresponding public keys for the e-mail recipient. FIG. 10 is a flow diagram illustrating the operation of a certificate lookup module (not shown) of the security manager 226. As is discussed above, certificates are employed by the security manager 226 to securely transmit e-mail message. In one embodiment, the policy dictates encryption for one or more recipients in accordance with the method that was discussed with reference to FIG. 6(*a*). In another embodiment, the policy dictates encryption for an e-mail firewall of one or more recipients in accordance with the method that was discussed with reference to FIG. 6(*b*). In both methods, the security manager 226 is accessing the recipient's, or the e-mail firewall's, public key. Hence, the security manager 226 retrieves digital certificates, which are typically used to store public keys. When the source of digital certificates is not fully trusted, the security manager 226 first verifies the validity of the digital certificate before employing it to encrypt a message. The verification of encryption certificates is preferably in accordance with the process discussed above with reference to the signature certificate verification process.

In one embodiment, the security manager includes a local persistent mapping from recipient e-mails and/or SMTP server domain to digital certificate. This mapping is referred to as a local digital certificate database. The local digital certificate database is configured and maintained by the system administrator of the e-mail firewall. The local database is usually considered trusted by the security manager, thereby optionally relieving the requirement for verification of digital certificate validity. The maintenance and query of such a database is well known in the art, such as by employing a key-value database or a relational database.

Figure 12:
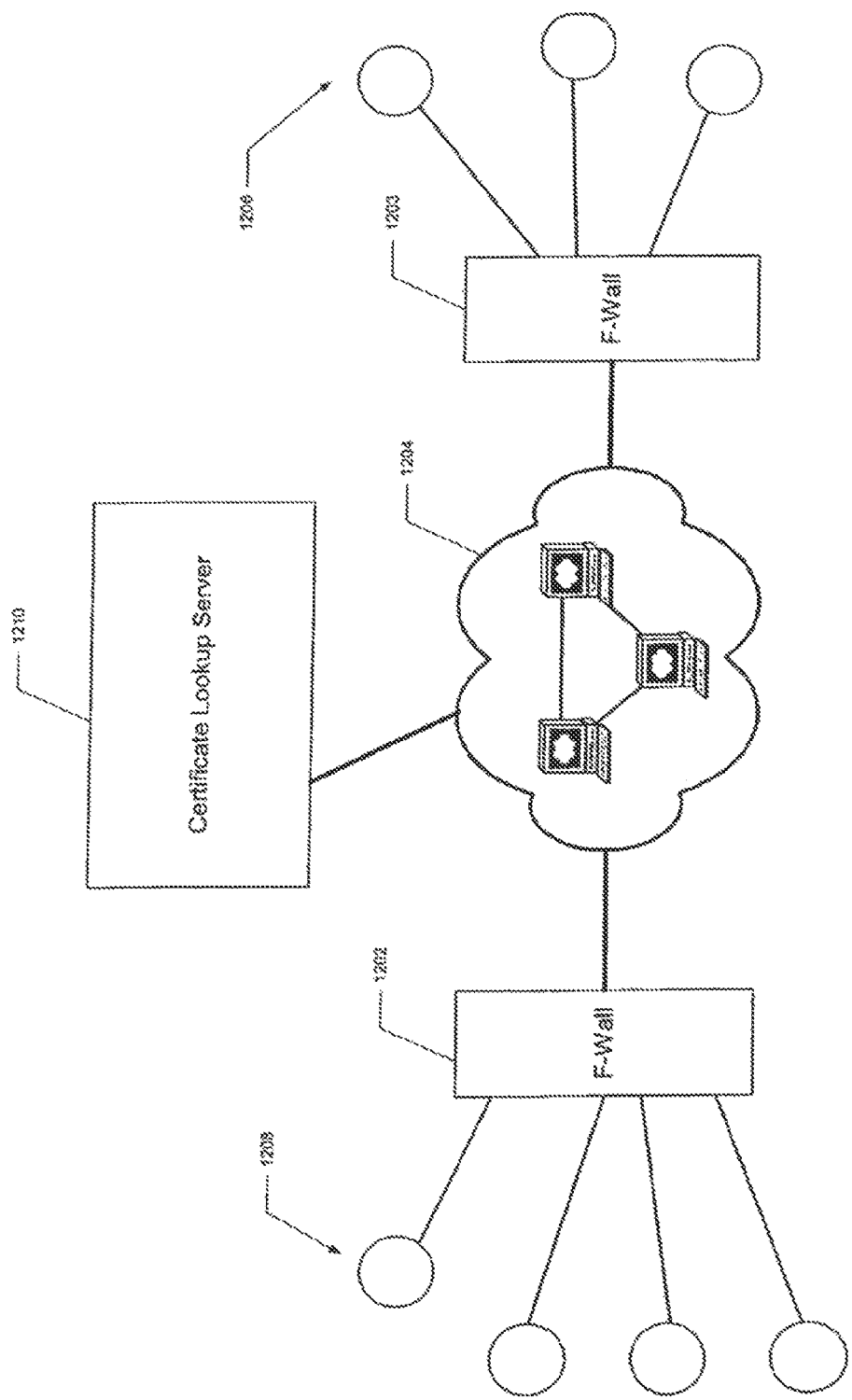
FIG. 12 is block diagram showing an arrangement of email firewalls and an external certificate lookup server.

In another embodiment, the security manager 226 uses one or more remote certificate lookup servers in addition to, or in lieu of, the local digital certificate database of the previous embodiment. In this embodiment, the maintenance of the remote certificate database is not performed by the system administrator of the e-mail firewall but is by the system administrators of remote certificate lookup servers, which can be controlled by a trusted third party, such as a Certificate Authority (CA). FIG. 12 illustrates such arrangement where an external certificate lookup server 1210 is employed to provide security data, including certificate data, to e-mail firewalls 1202, 1203. A first plurality of user computers 1208 is coupled to a first firewall 1202 by a local network connection. In one embodiment, the local network connection between the user computers 1208 and the e-mail firewall 1202 is a secure private network, as is known in the art. The first e-mail firewall is coupled to a public network 1204, such as the internet, by a network connection. A second e-mail firewall 1203 is also coupled to the public network 1204 by a network connection. A second plurality of user computers 1206 is coupled to the second e-mail firewall 1203. The second plurality of user computers 1206 is preferably also coupled to the associated e-mail firewall 1203 by a secure private network. In another embodiment, the user computers are provided by the combination of user terminals and a corresponding mainframe server, as is known in the art.

A certificate lookup server 1210 is coupled to the public network 1204 by a network connection. The certificate lookup server 1210 preferably stores security data that is available to security processes in the firewalls 1202, 1203 for facilitating secure communication of e-mail messages over the public network 1204.

In another embodiment, the certificate lookup server is replaced by one or more intermediate e-mail firewalls which act as intermediate e-mails relays between the first e-mail firewall 1202 and the second e-mail firewall 1203. The ability to use an intermediate e-mail relay in a store-and-forward protocol such as SMTP is well known in the art. An intermediate e-mail firewall preferably receives an e-mail message from a sending firewall, encrypted for the subject intermediate e-mail firewall. The intermediate e-mail firewall then decrypts the subject e-mail, using its private certificate, and re-encrypts the subject e-mail, using the recipient e-mail firewall's public certificate. Finally, the intermediate e-mail firewall forwards the e-mail message to the recipient's firewall. Accordingly, the intermediate e-mail firewall is the only entity that needs access to the security data for recipient's e-mail firewalls. In this embodiment, the sending e-mail firewall locally stores encryption certificates for the intermediate e-mail firewall it is using to transmit secure e-mail messages without accessing any certificate retrieval directory. Accordingly, regardless of the intended recipient, the sending e-mail firewall employs the same encryption certificate to transmit encrypted e-mail messages to the recipient by way of the intermediate e-mail firewall. There is no need to employ multiple certificates for different recipient e-mail firewalls. Furthermore, there is no need to retrieve such certificates from the external certificate lookup server.

Turning back to FIG. 10, the certificate lookup module optionally starts by a local search, as in the first embodiment, and resets the available certificates list so as to contain locally stored trusted certificates matching the recipient's e-mail or the recipient's server domain, if any one available (step 1001). The certificate lookup module then submits a remote query to one of several privately or publicly available certificate lookup servers, requesting certificates associated with the recipient e-mail or with the recipient's server. The certificate lookup module preferably employs the Lightweight Directory Access Protocol (LDAP) to query the remote servers for certificates. However, use of other standard or non-standard lookup protocols is not precluded. If the certificate server responds with certificates, the certificates are added to the available certificates list (step 1005). If the certificate lookup server returns no certificates, the certificate lookup module proceeds to the next certificate lookup server, if any such servers remain (step 1007). After adding certificates to the available certificate list in step 1005, the certificate lookup module proceeds to validate the certificates in the list (steps 1009, 1011, 1013). Alternatively, to offer the largest choice of certificates to the policy engine, the lookup is performed against all servers even after some certificates are found. Furthermore, in other embodiments, instead of querying the certificate lookup servers in sequence, remote servers are queried in parallel using multithreading programming techniques, which are well-known in the art. Next, the certificate lookup module proceeds to apply verification policy to the certificates in the available certificates list (steps 1009, 1011, 1013).

For each certificate in the list, policy is applied to determine whether the certificate is acceptable (step 1011). In one embodiment, such policies refer to the certificate's validity dates, usage restrictions, chain verification, root verification, key strength, algorithm restrictions, and presence in one or more Certificate Revocation Lists (CRLs). A certificate that is deemed invalid is discarded from the acceptable certificate list.

Once the list of acceptable certificates is finalized, the policy optionally specifies preferences used to sort the list of acceptable certificates. In one embodiment, a policy assigns preference to certificates with longer keys or to certificates issued by one CA over another CA. The policy preferably dictates to use the top certificate of the list. In another embodiment, the policy dictates encrypting to the top 2, 3, or N certificates. If none of the certificates are acceptable, a corresponding message is provided to the security manager 226 to indicate that encryption is not available for the recipient. In one embodiment, the resulting certificates are stored in a local flat database, as is known in the art, which can act as a local cache of the remote certificate lookup servers.

In another embodiment, the policy requires the certificates to be verified against a Certificate Revocation List (CRL). The certificate lookup module accesses a CRL on one or more remote server systems, which can be different from the certificate lookup servers. Preferably, the CRL is published in predetermined locations that are accessible to the lookup module. In one embodiment, the lookup module employs the Online Certificate Status Protocol (OCSP), which defines a protocol for submitting a certificate identifier and receiving a response regarding the revocation status of the certificate.

In another embodiment, the complex task of searching for and validating certificates, as well as applying the policy requirements and preferences to the matching certificates (FIG. 10), is delegated to an external trusted server (herein certificate lookup and verification server). The advantages of this embodiment parallel those of the signature verification server, described earlier in this application, which include removing complexity from the e-mail firewall server and simplifying system administration by delegating tasks to a remote server, administered by a trusted third party, such as a CA. In this embodiment, the e-mail firewall submits the e-mail address of the recipient, or the domain of the recipient's e-mail, to the certificate lookup and verification server and optionally submitting a description of the policy requirements, or preferences, for the certificates. The certificate lookup and verification server responds by facilitating the lookup and verification according to its own policies or according to the policies submitted by the e-mail firewall. The processing logic of the certificate lookup and verification server is similar to the logic of the security manager 226 as discussed with reference to the previous embodiment. Such logic includes querying local storage of the lookup and verification server, querying remote certificate lookup servers, verifying certificates according to policy requirements, and sorting certificates according to policy preferences. The response, which includes a sorted list of one or more certificates, is returned by the certificate lookup and verification server to the security manager 226 of the e-mail firewall. The e-mail firewall can then use these certificates to perform encryption.

As may be appreciated, the certificate lookup and verification server is preferably a trusted server. Furthermore, the communication between the e-mail firewall and the certificate lookup and verification server is preferably authenticated. The authentication can be achieved with SSL connection or by having the certificate lookup and verification server sign its answer. As discussed above, although this authentication method requires the e-mail firewall to verify a signature, such verification does not draw much processing power since the e-mail firewall employs a known set of certificate lookup and verification servers and accordingly can locally store these certificates. The communication encoding used by the e-mail firewall and the certificate lookup and verification server include XML, ASN.1 encoding, and MIME. It should also be appreciated that the certificate lookup and verification server can be combined with the signature verification server described earlier. It should also be appreciated that for network performance the e-mail firewall may submit several request to the certificate lookup and verification server in one network transaction instead of performing a transaction for each recipient. The transport of requests and responses between the e-mail firewall and the certificate lookup and verification server include plain TCP/IP socket, HTTP transaction, secure HTTP transaction, Common Object Request Broker (CORBA) invocation, Remote Method Invocation (RMI), and Remote Procedure Call (RPC) invocation.

Figure 6B:
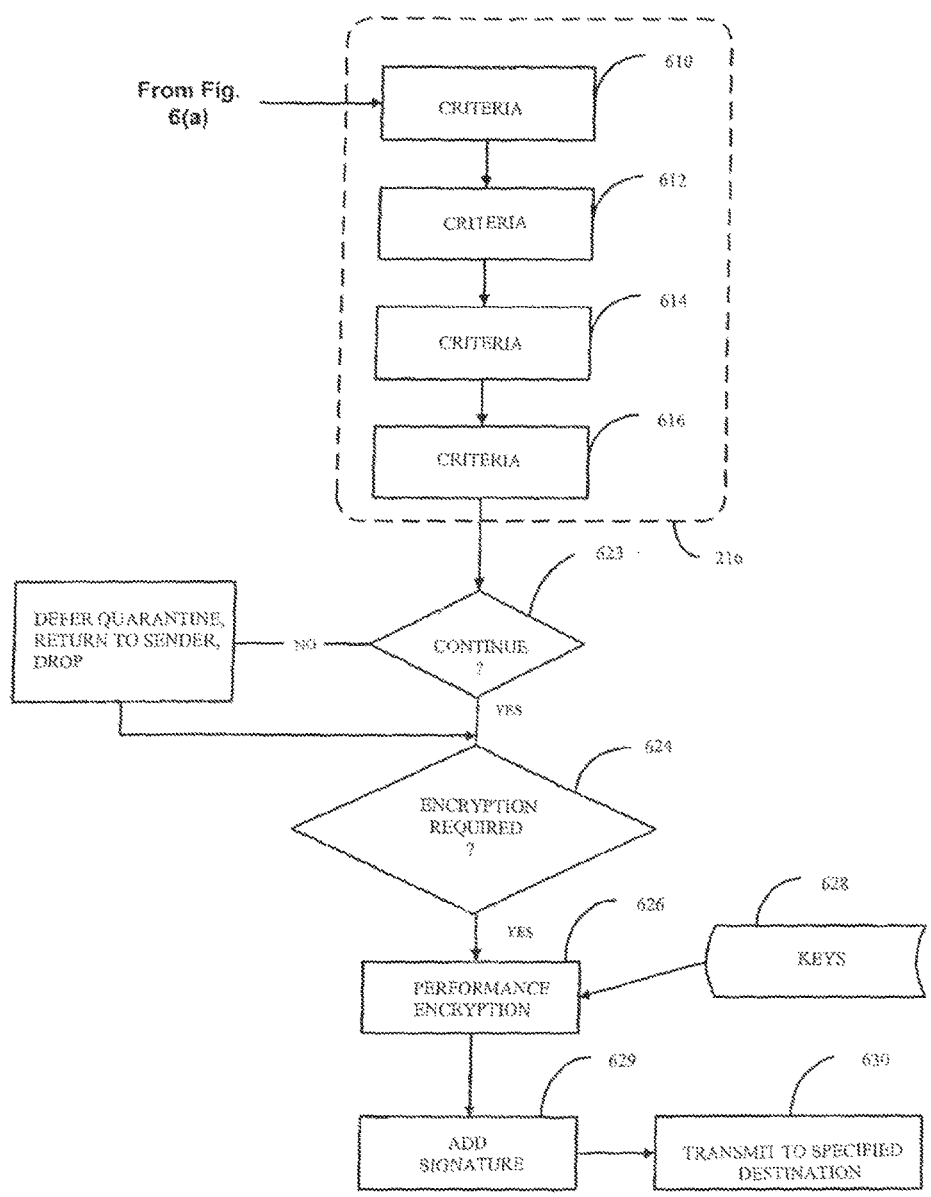
Figure 11:
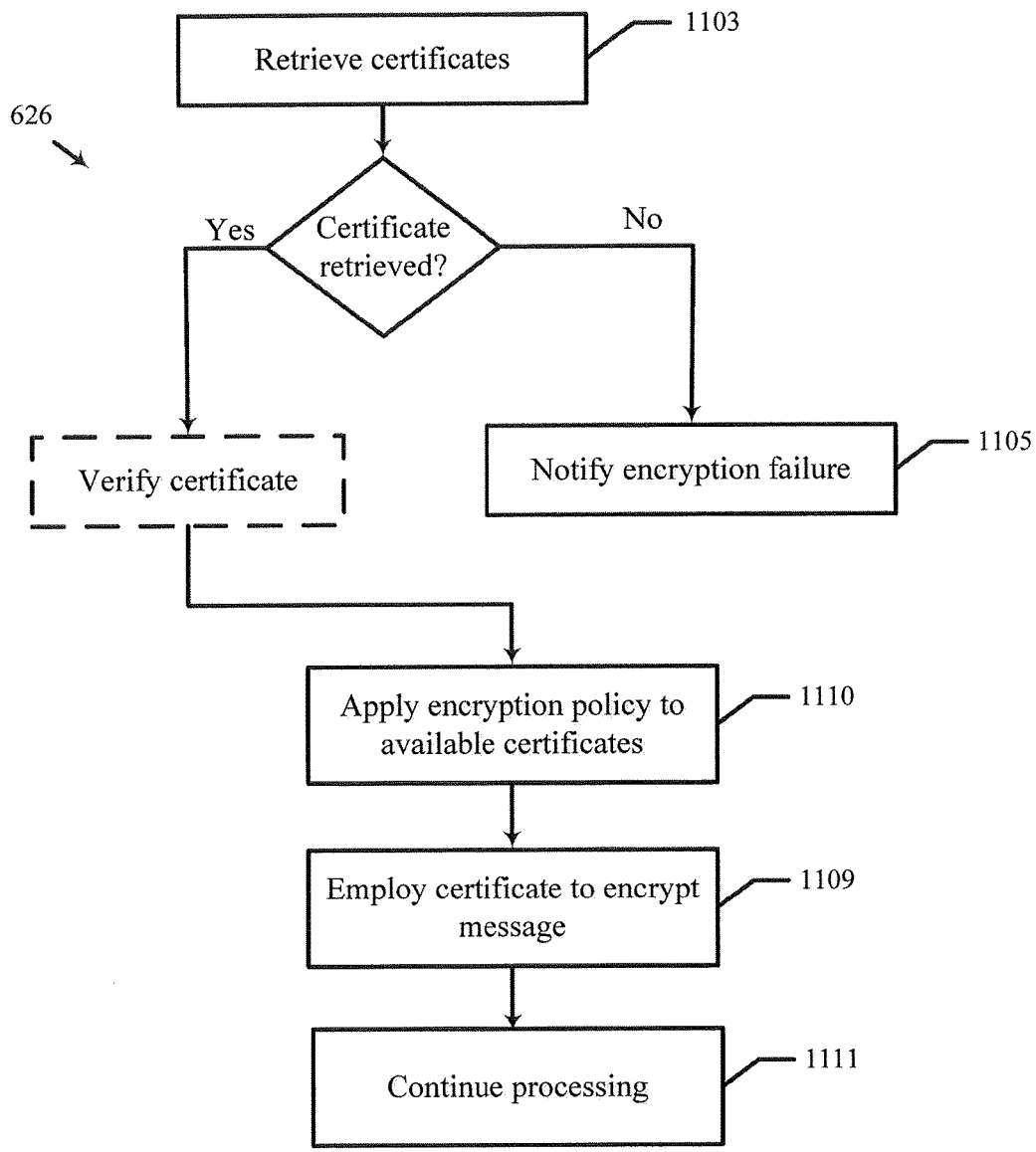
FIG. 11 is a flowchart illustrating applying encryption to e-mail message transmission.

FIG. 11 illustrates further details of the operation of the security manager during the encryption step 626 of FIG. 6(b). It should be appreciated that whatever lookup method is used to retrieve the digital certificate during the encryption process, the available certificates can include more than one certificate. In one embodiment, policies are employed to enforce requirements on the encryption certificates, such as minimum key length or specifying a root Certificate Authority (CA). These requirements, provided by applicable policies for the processed message, are then used to filter the available certificates, down to a final list of acceptable encryption certificates. The security manager 226 retrieves available certificates for encrypting e-mail messages (Step 1103). In one embodiment, the certificates are retrieved from a local source. In another embodiment, the security manager 226 employs a lookup module to submit a query to a public security server and retrieve certificates for the desired server. The security manager 226 continues to determine whether any certificates were retrieved, regardless of source. If no certificates were retrieved, the security manager 226 indicates that encryption has failed for the intended recipient (Step 1105). In one embodiment, if certificates are retrieved, the security manager 226 proceeds to validate the certificates by employing an external directory, as discussed above (step 1107). In yet another embodiment, the security manager 226 proceeds without validating the certificate. Preferably, when an acceptable certificate list is employed, as discussed with reference to FIG. 10, the security manager 226 does not validate the certificates. The preferences specified by the applicable policies are then used to generate a list of acceptable encryption certificates in order of decreasing preference (Step 1110). The top certificate in the sorted list is preferably used for encryption. In one embodiment, this policy filtering procedure is performed by the security manager 226 on a per message basis. In other embodiments, the policy filtering procedure is by the security manager 226 on a firewall by firewall basis, as configured by an administrator. The security manager 226 proceeds to encrypt the e-mail message by employing the retrieved certificate (step 1109). After encryption of the message the security manager 226 continues processing the message, as discussed with reference to FIG. 6(b).

FIG. 7 is a block diagram showing further details of alternative actions 622. Messages received from disposition step 620 are stored in one of the four queues 702, which include quarantine queue 704, retry queue 706, dead letter queue 708, and defer queue 709 depending upon the specified disposition of the message. Quarantine queue 704 stores messages for subsequent retrieval and review by a system administrator or other authorized person. Retry queue 706 stores messages for which delivery has failed. Transmission of messages in the retry queue 706 is subsequently re-attempted. Dead letter queue 708 stores messages which continue to be undeliverable after several retries and which cannot be returned to the sender. Messages in the dead letter queue 708 may be acted upon by a system administrator. Defer queue 709 stores messages to be delivered automatically at a later time, for example an off-peak-time such as a weekend or night time. Configuration module 230 provides a plurality of actions 710-713 which may be performed on the messages in queue 702. The messages can be viewed 710 by the administrator, returned to the sender 711, deleted 712, sent to the specified destination(s) 713 and/or saved 714.

Although the present invention was discussed in terms of certain preferred embodiments, the invention is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A system comprising:
 a messaging firewall that cooperates with a remote publicly accessible security server to securely transmit e-mail messages, wherein the messaging firewall encrypts an e-mail message in accordance with at least one encryption key and determines, based on textual content, a destination, a size, and a source of the e-mail message, whether application of a signature to the e-mail message is required, the e-mail message being sent from the source to one or more recipients;

wherein the messaging firewall queries the remote security server for an encryption key including related encryption data which is associated with at least one target server for the e-mail message, and that in response to a determination that application of a signature is required for the e-mail message, retrieves the signature and a certificate associated with the source of the e-mail message;

wherein the encryption key is the recipient's public key;

wherein the certificate is used to store the recipient's public key;

wherein the signature is applied to the e-mail message to allow for a recipient of the one or more recipients to authenticate the source, wherein the encryption key is stored in the remote security server, and the certificate is included with the signature; and wherein the messaging firewall transmits the e-mail message to at least one target server for which encryption data was retrieved by the messaging firewall.

2. The system of claim 1, further including:
a security manager, wherein when a source of the retrieved certificate is not fully trusted, the security manager verifies a validity of the certificate.

3. The system of claim 2, wherein the security manager uses the retrieved certificate to encrypt the e-mail message in accordance with verification that the retrieved certificate is valid.

4. The system of claim 2, wherein the security manager includes a local database, and when the certificate is retrieved from the local database, a signature verification process is reported as successful.

5. The system of claim 4, wherein the local database stores a persistent mapping from the recipient's e-mail address to the certificate.

6. The system of claim 4, wherein the local database stores a persistent mapping from the recipient's server domain to the certificate.

7. The system of claim 4, wherein the local directory stores trusted certificates that do not require full verification.

8. The system of claim 1, wherein the remote security server is a Certificate Authority (CA).

9. A method of securely transmitting e-mail messages, the method comprising:
encrypting, at a messaging firewall, an e-mail message in accordance with at least one encryption key, the e-mail message being sent from a source to one or more recipients;

determining based on textual content, a destination, a size, and the source of the e-mail message, whether application of a signature to the e-mail message is required;

querying, at the messaging firewall, a remote security server for an encryption key including related encryption data which is associated with at least one target server for the e-mail message, wherein the encryption key is the recipient's public key;

in response to a determination that application of a signature is required for the e-mail message, retrieving the signature and a certificate associated with the source of the e-mail message, wherein the certificate is used to store the recipient's public key, wherein the signature is applied to the e-mail message to allow for a recipient of the one or more recipients to authenticate the source, wherein the encryption key is stored in the remote security server, and the certificate is included with the signature; and transmitting the e-mail message to at least one target server for which encryption data was retrieved by the messaging firewall.

10. The method of claim 9, further including:
when a source of a the retrieved certificate is not fully trusted, verifying a validity of the certificate.

11. The method of claim 10, further including:
using the retrieved certificate to encrypt the e-mail message in accordance with verification that the retrieved certificate is valid.

12. The method of claim 10, further including:
when the certificate is retrieved from a local database, the signature verification process is reported as successful.

13. The method of claim 12, wherein the local database stores a persistent mapping from the recipient's e-mail address to the certificate.

14. The method of claim 12, wherein the local database stores a persistent mapping from the recipient's server domain to the certificate.

15. The method of claim 12, wherein the local directory stores trusted certificates that do not require full verification.

16. A computer program product encoded in one or more non-transitory media, the computer program product including instructions that when executed by one or more processors causes the one or more processors to perform a method comprising:
encrypting, at a messaging firewall, an e-mail message in accordance with at least one encryption key, the e-mail message being sent from a source to one or more recipients;

determining based on textual content, a destination, a size, and the source of the e-mail message, whether application of a signature to the e-mail message is required;

querying, at a messaging firewall, a remote security server for an encryption key including related encryption data which is associated with at least one target server for the e-mail message, wherein the encryption key is the recipient's public key;

in response to a determination that application of a signature is required for the e-mail message, retrieving a signature and a certificate associated with the source of the e-mail message, wherein the certificate is used to store the recipient's public key, wherein the signature is applied to the e-mail message to allow for a recipient of the one or more recipients to authenticate the source, wherein the encryption key is stored in the remote security server, and the certificate is included with the signature; and transmitting the e-mail message to at least one target server for which encryption data was retrieved by the messaging firewall.

\* \* \* \* \*